(12) United States Patent
Wouhaybi et al.

(10) Patent No.: US 9,174,116 B2
(45) Date of Patent: Nov. 3, 2015

(54) SYSTEM FOR DEVELOPING, MANAGING, ACQUIRING AND PLAYING ELECTRONIC BOARD GAMES

(71) Applicant: INTEL CORPORATION, Santa Clara, CA (US)

(72) Inventors: Rita H. Wouhaybi, Portland, OR (US); Sai P. Balasundaram, Beaverton, OR (US); David I. Shaw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/631,265

(22) Filed: Sep. 28, 2012

(65) Prior Publication Data

US 2014/0094312 A1    Apr. 3, 2014

(51) Int. Cl.
*A63F 9/24* (2006.01)
*A63F 3/00* (2006.01)

(52) U.S. Cl.
CPC ... *A63F 3/00643* (2013.01); *A63F 2003/00659* (2013.01); *A63F 2003/00662* (2013.01); *A63F 2003/00883* (2013.01)

(58) Field of Classification Search
CPC ............................... A63F 9/24; A63F 3/00643
USPC ..................... 273/237, 238; 463/42
See application file for complete search history.

(56) References Cited

U.S. PATENT DOCUMENTS

| | | | | |
|---|---|---|---|---|
| 4,343,609 A * | 8/1982 | Cardinal | | 434/128 |
| 4,372,558 A * | 2/1983 | Shimamoto et al. | | 463/41 |
| 4,969,650 A * | 11/1990 | Magara et al. | | 273/238 |
| 5,088,928 A * | 2/1992 | Chan | | 434/339 |
| 5,690,332 A * | 11/1997 | Rechs | | 273/260 |
| 8,602,857 B2 * | 12/2013 | Morichau-Beauchant et al. | | 463/6 |
| 2008/0199837 A1* | 8/2008 | Kuester et al. | | 434/129 |
| 2010/0016083 A1* | 1/2010 | Bruce | | 463/42 |
| 2012/0052934 A1* | 3/2012 | Maharbiz et al. | | 463/9 |
| 2013/0288757 A1* | 10/2013 | Guthridge et al. | | 463/2 |
| 2014/0170929 A1* | 6/2014 | Lipman | | 446/175 |

* cited by examiner

*Primary Examiner* — Corbett B Coburn
(74) *Attorney, Agent, or Firm* — Barnes & Thorburg LLP

(57) ABSTRACT

A device, method, and system for developing, managing, acquiring and playing electronic board games. Game developers may illustratively access one or more electronic game board, game piece templates and/or other game development application software from a game server to design and develop electronic board games. Such electronic board games may then be acquired by game players in the form of full, limited and/or modifiable versions. A game service module of the game server makes a number of electronic board game related services available to game players for managing, playing and acquiring electronic board game collections and/or for enhancing or facilitating electronic board game playing.

22 Claims, 12 Drawing Sheets

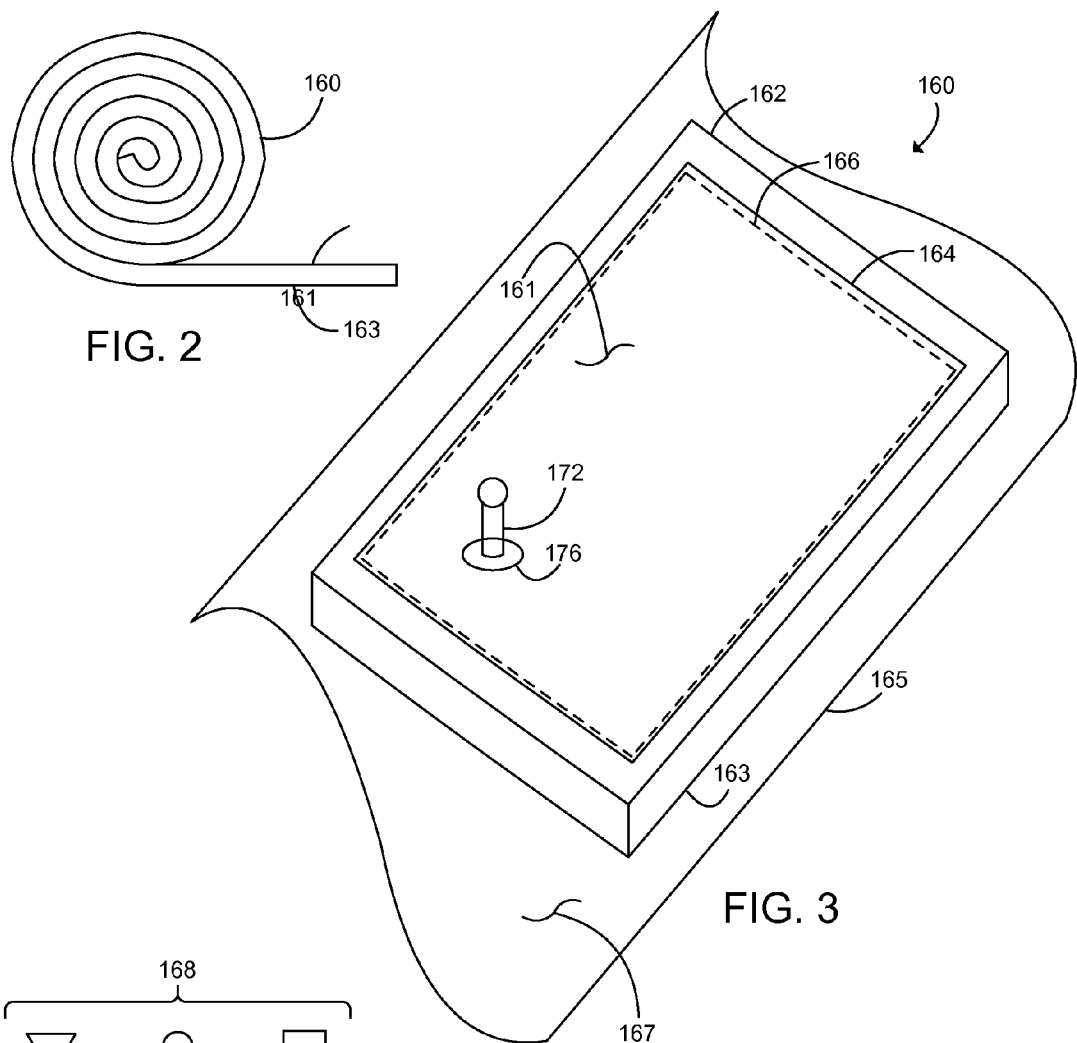

SYSTEM FOR DEVELOPING, MANAGING, ACQUIRING AND PLAYING ELECTRONIC BOARD GAMES

BACKGROUND

Many different types, styles, and versions of conventional board games are commercially available, and have been played by persons of all ages and backgrounds for several generations. Typically, such board games include a physical game board with a static graphical representation of a game playing surface on one side, and a plurality of physical game pieces such as dice, cards, game currency, and/or other paper, plastic and/or metal pieces.

Personal computing devices are ubiquitous in modern society, with many persons owning and/or operating multiple personal computing devices daily. Many personal computing devices are internet-accessible, and some such personal computing devices have large display screens and/or may be oriented and supported with their display screens facing upwardly. The personal computing devices may be used for any one or more uses including business, personal data management, and entertainment such as electronic games.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 2 is a simplified diagram of at least one embodiment of a physically flexible version of the user computing device illustrated in the system of FIG. 1;

FIG. 3 is a simplified diagram of the user computing device of FIG. 1 shown with a hardware game piece positioned upon and in contact with a display screen of the user computing device;

FIG. 4 is a simplified diagram of at least one embodiment of a collection of unique hardware game pieces which may be used to distinguish game players from one another;

FIG. 5 is a bottom plan view of the collection of unique hardware game pieces illustrated in FIG. 4 showing uniquely shaped footprints of each game piece in the collection of unique hardware game pieces;

DETAILED DESCRIPTION OF THE DRAWINGS

Figure 1:
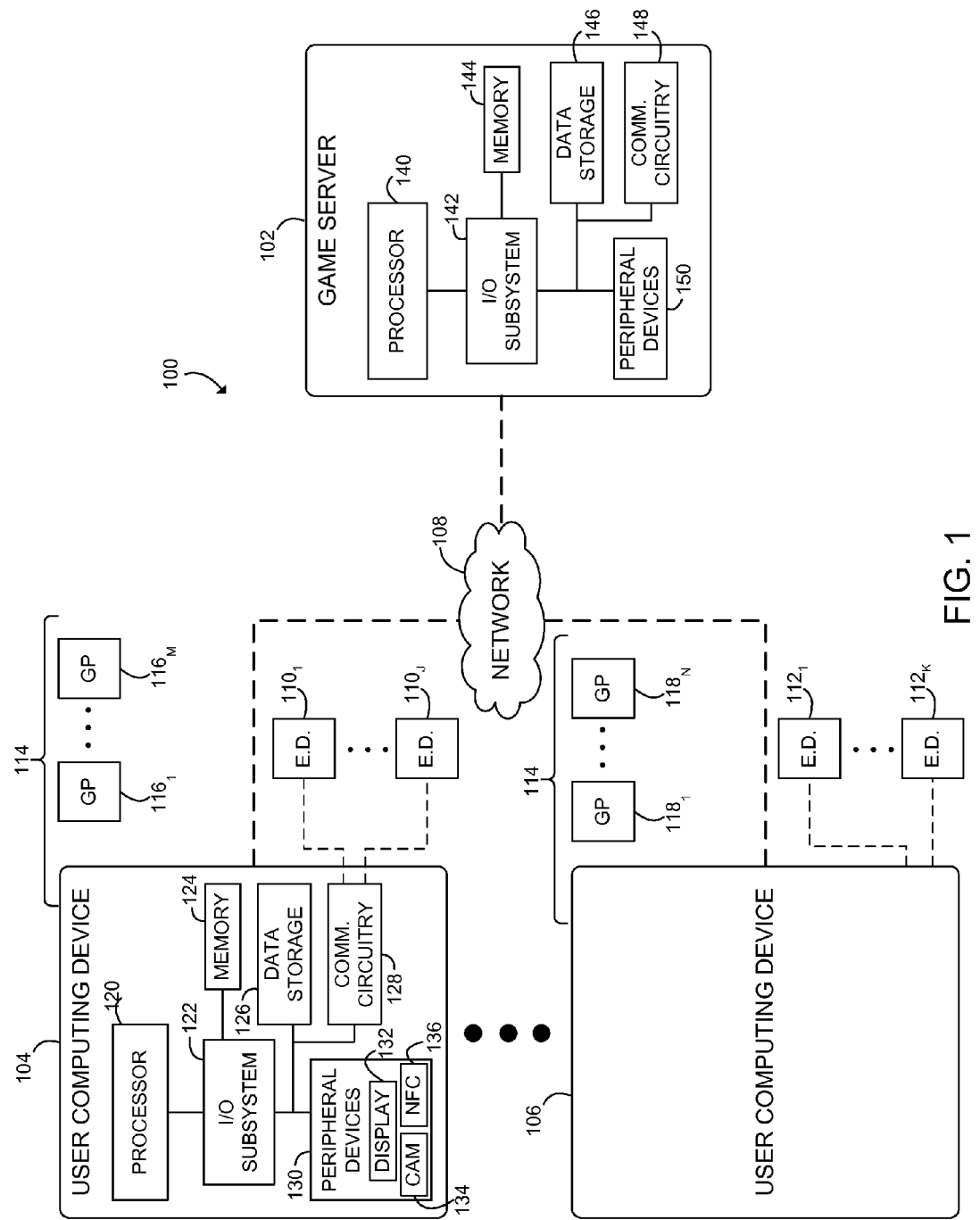
FIG. 1 is a simplified block diagram of at least one embodiment of a system for developing, managing, acquiring and playing electronic board games.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 7:
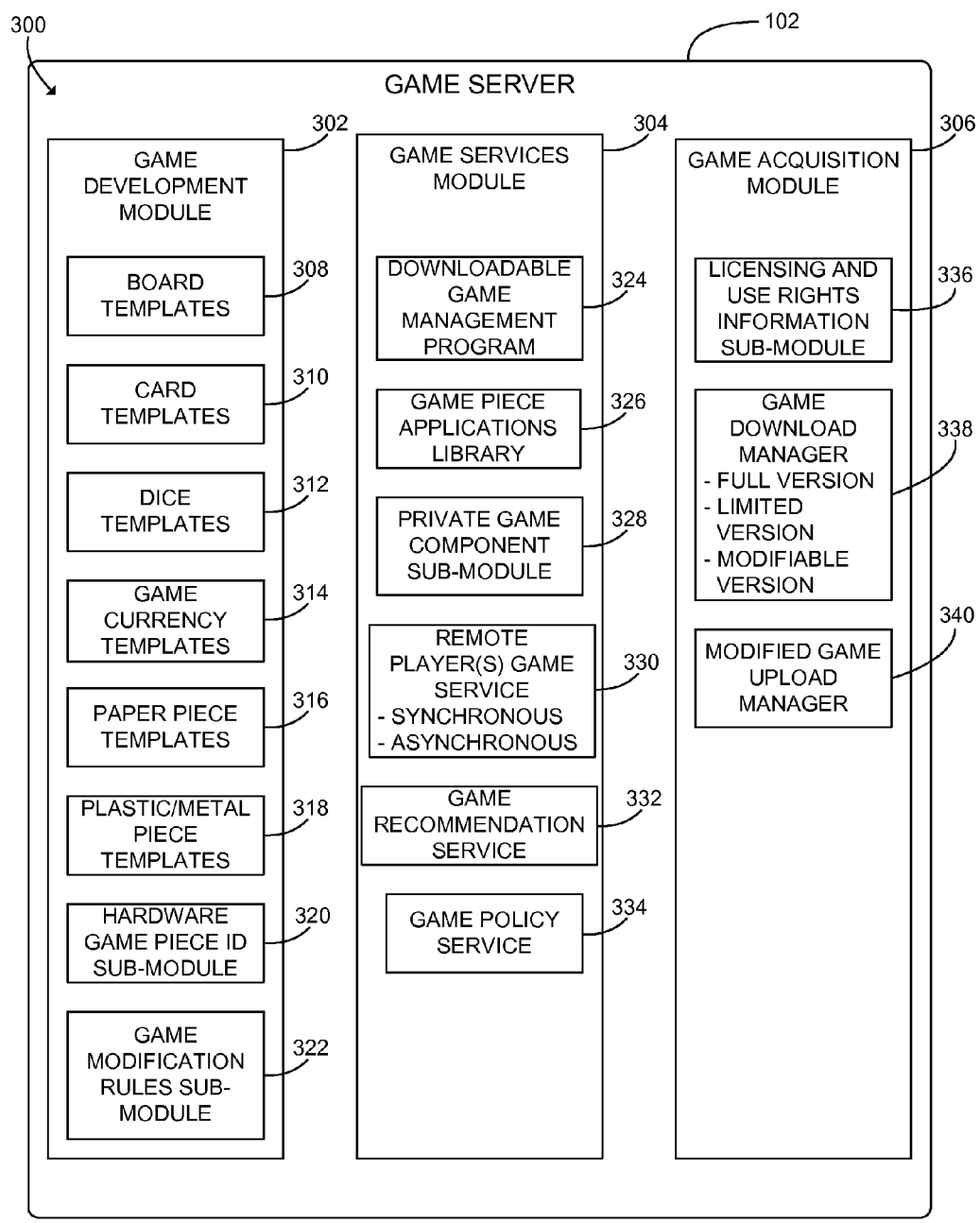
FIG. 7 is a simplified block diagram of at least one embodiment of an environment of the game server illustrated in the system of FIG. 1.

Referring now generally to FIGS. 1 and 7, an embodiment of a system 100 is shown for developing, managing, acquiring and playing electronic board games. In the illustrated embodiment, the system 100 includes a game server 102 configured to provide a framework for developing, managing, acquiring and providing services for electronic board games over a network 108, which electronic board games may be acquired and played by one or more users via one or more corresponding user computing devices, e.g., 104 and 106. As discussed in more detail below, the game server 102 illustratively includes a game development module 302 configured to provide access to a number of game-related templates and other software for use by one or more game developers to develop modified and/or unmodified, electronic versions of one or more existing, conventional board games, and/or to develop new electronic board games.

The game server 102 further illustratively includes a game acquisition module 306 configured to allow one or more users to acquire various versions of one or more electronic board games, such as limited versions, full or complete versions and modifiable versions, and to allow users to upload modified versions of games and thereby make such modified versions available to others. The game server 102 further illustratively includes a game services module 304 configured to provide various game-related services to users. Users may acquire one or more standardized and/or custom hardware game pieces 114 and/or sets of hardware game pieces for use during game play. Alternatively or additionally, users and/or one or more other game players may acquire one or more "virtual" game pieces, e.g., software applications, using any of a number of electronic devices, e.g., $110_1$-$110_J$, $112_1$-$112_K$, and may use any such virtual game pieces in addition to, or in place of, corresponding hardware game pieces during game play. Additionally, in games that require certain information to be kept private from other game players, users and other game players may each utilize one of the number of electronic devices, e.g., $110_1$-$110_J$, $112_1$-$112_K$, to acquire and use one or more general purpose or dedicated software application(s) configured to display and manage game information that is private only to that player.

In the embodiment illustrated in FIG. 1, the user computing device 104, of the system 100 may be embodied as any type of computing device capable of performing the functions described herein. For example, each of the user computing device 104 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic game software and related applications. Additionally, although the system 100 is illustrated in FIG. 1 as including two user computing devices 104, 106, it should be appreciated that the system 100 may include any number of user computing devices.

In the illustrative embodiment of FIG. 1, the user computing device 104 includes a processor 120, an I/O subsystem 122, a memory 124, a data storage 126, a communication circuitry 128, and one or more peripheral devices 130. Additionally, in some embodiments, one or more of the illustrative components may be incorporated in, or otherwise from a portion of, another component. For example, the memory 124, or portions thereof, may be incorporated in the processor 120 in some embodiments. Furthermore, it should be appreciated that the user computing device 104 may include other components, sub-components, and devices commonly found in a computer and/or computing device, which are not illustrated in FIG. 1 for clarity of the description.

The processor 120 of the user computing device 104 may be embodied as any type of processor currently known or developed in the future and capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage currently known or developed in the future and capable of performing the functions described herein. In operation, the memory 124 may store various data and software used during operation of the user computing device 104 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the user computing device 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the user computing device 104, on a single integrated circuit chip.

The communication circuitry 128 of the user computing device 104 may be embodied as any communication circuit, device, or collection thereof, capable of enabling communications between the user computing device 104 and the game server 102 and/or other remote devices and, in embodiments in which one or more of the electronic devices $110_1$-$110_J$ are used, between the user computing device 104 and the one or more electronic devices $110_1$-$110_J$. Communication between the user computing device 104 and the game server 102 and/or between the user computing device 104 and the one or more electronic devices $110_1$-$110_J$ may take place wirelessly via the network 108, wherein the network 108 may represent, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the user computing device 104 and the game server 102 and/or between the user computing device 104 and the one or more electronic devices $110_1$-$110_J$ may be, in whole or in part, a wired connection. Generally, the communication circuitry 128 may be configured to use any one or more, or combination, of communication protocols to communicate with the game server 102 such as, for example, a wired network communication protocol (e.g., TCP/IP), a wireless network communication protocol (e.g., Ethernet, Bluetooth®, Wi-Fi®, WiMAX), a cellular communication protocol (e.g., Wideband Code Division Multiple Access (W-CDMA)), and/or other communication protocols.

The one or more peripheral devices 130 may include any number of input/output devices, interface devices, and/or other peripheral devices. For example, the peripheral devices 130 will typically include a display 132 and graphics circuitry and, in some embodiments, may further include a keyboard, a mouse, audio processing circuitry (including, e.g., conventional amplification circuitry and one or more speakers), and/or other input/output devices, interface devices, and/or peripheral devices. The display 132 of the user computing device 104 may generally be or include any device or surface currently known or developed in the future and capable of rendering an image based on electronic input. The display 132 may be embodied as, or otherwise use, for example, any suitable display technology including, for example, a liquid crystal display (LCD), a light emitting diode (LED) display, a cathode ray tube (CRT) display, a plasma display, and/or other display technology currently known or developed in the future. Although only a single display 132 is illustrated in FIG. 1, it should be appreciated that the user computing device 104 may include multiple displays or display screens on which the same or different content may be displayed contemporaneously or sequentially with each other. The one or more peripheral devices 130 may further include one or more a cameras 134 which may be positioned and configured to capture images and/or video of game pieces 114 positioned on the surface of the display 132 for purposes of associating the various game pieces 114 with corresponding players, and for identifying and tracking such game pieces during game play. The one or more cameras 134 may be positioned, for example, to capture images and/or video of game pieces 114 from above and/or beside the display surface of the display 132, or may alternatively or additionally be positioned below the display 132, e.g., within the user computing device 104, to capture images and/or video of the base or footprints of the game pieces 114 from below the display surface of the display 132. The one or more peripheral devices 130 may further include one or more conventional near-field communication (NFC) devices positioned and configured to communication with corresponding NFC devices attached to or carried by the various game pieces 114 for the purpose of associating the various game pieces 114 with corresponding players, and for identifying and tracking such game pieces during game play.

The data storage 126 may be embodied as any type of device or devices configured for short-term or long-term storage of data such as, for example, memory devices and circuits, memory cards, hard disk drives, solid-state drives, or other data storage devices. In the illustrative embodiment, the user computing device 104 may maintain one or more electronic games, one or more electronic game and/or game piece templates, one or more virtual game piece applications, one or more private game component applications and/or other information in the data storage 126.

With some electronic board games, it may be desirable to utilize one or more hardware game pieces or sets of hardware game pieces during game play, e.g., for the purpose of providing some amount of physical control, for providing tactile feedback, and/or for promoting or developing physical dexterity. Some such hardware game pieces may be standardized, i.e., usable with several different types of electronic board games, while others may be custom pieces specific to one or a family of games. Examples of such hardware game pieces may include, but should not be limited to, two or more unique game pieces for identifying two or more corresponding game players, a die or dice, cards, game currency, and other paper items, walls, bridges, buildings such as houses, hotels and the like, human and/or other characters, weapons, sports-related items, and/or other plastic, metal or other rigid, semi-rigid or flexible game pieces. The one or more standardized and/or custom hardware game pieces and/or sets of hardware game pieces 114 shown with the user computing device 104 may include any number of hardware game pieces and/or sets of hardware game pieces $116_1$-$116_M$, where M may be any positive integer. Likewise, the one or more electronic devices shown with the user computing device 104 may include any number of such electronic devices $110_1$-$110_J$, where J may be any positive integer. In some embodiments, for example, only one electronic device $110_1$ may be used by a single player or passed around and used by multiple players, and in other embodiments each of a plurality of players will use a different one of the electronic devices $110_1$-$110_J$.

The user computing device 106 may be substantially similar to the user computing device 104 and include similar components, which have been identified in FIG. 1 with common reference numbers. As such, the description provided above of the components of the user computing device 104 may be equally applicable to those similar components of the user computing device 106 and are not repeated herein so as not to obscure the present disclosure. Of course, it should be appreciated that in some embodiments the user computing devices 104, 106 (or other user computing devices of the system 100) may be dissimilar to each other. For example, the user computing devices of system 100 may be embodied as various types of computing devices different from each other (e.g., a desktop computer, a mobile computer, a tablet computer, a smart phone, or other computing device) and include components typically found in such corresponding computing devices. As another example, the one or more standardized and/or custom hardware game pieces and/or sets of hardware game pieces 114 shown with the user computing device 106 may include any number of hardware game pieces and/or sets of hardware game pieces $118_1$-$118_N$, where N may be any positive integer and where N may or may not be equal to M. Likewise, the one or more electronic devices shown with the user computing device 106 may include any number of such electronic devices $112_1$-$112_K$, where K may be any positive integer and where K may or may not be equal to J.

As discussed briefly above, the game server 102 is configured to make available to game developers a number of board game templates and other related software, and to make available to users (game players) a number of electronic board games and various game services, via the network 108. Although only one such game server 102 is shown in FIG. 1, it should be appreciated that, in other embodiments, the system 100 may include any number of game servers.

The game server 102 may be embodied as any type of server (e.g., a web server) or similar computing device capable of performing the functions described herein. In the illustrative embodiment of FIG. 1, the game server 102 includes a processor 140, an I/O subsystem 142, a memory 144, a data storage 146, a communication circuitry 148, and one or more peripheral devices 150. Such components of the game server 102 may be similar to the corresponding components of the user computing device 104, the description of which is applicable to the corresponding components of the game server 102 and is not repeated herein for clarity of the description.

In the user computer device 104, 106, the processor 120 is illustratively operable during execution of an electronic board game to render an image of the playing surface of the game board on its display 132 such that the electronic board game may be played on and/or on the surface of the display 132. In order to simulate conventional board game play, it is desirable in some embodiments to implement the user computing device 104, 106 in the form of a computing device in which the display 132 (e.g., monitor, display screen or other surface upon which an image of the playing surface of the game may be rendered) is or may be oriented upwardly in the same manner as a conventional board game supported on a table top or similar structure/surface. In such embodiments, the user computing device 104, 106 may, for example, be provided in the form of a conventional tablet computer which has a large display area on one face or surface that may be oriented upwardly by supporting the opposite face or surface on a table top or similar structure/surface. As another example of this embodiment, the user computing device 104, 106 may be provided in the form of a conventional flexible or semi-flexible computing device 160 as shown in FIG. 2 in its rolled-up (e.g., storage) state and as shown in FIG. 3 in its un-rolled state. Other such forms of the user computing device 104, 106 will occur to those skilled in the art, and any such other forms are contemplated by this disclosure. It should be understood, however, that such forms of the user computing device 104, 106 should not be considered to be limiting in any way, and that this disclosure contemplates other embodiments in which the display screen of the user computing device 104, 106 is not or may not be oriented upwardly as just described.

Referring to FIGS. 2 and 3, the flexible or semi-flexible computing device 160 has a top surface 161 and a bottom surface or underside 163 opposite the top surface 161. The top surface 161 illustratively defines a border 162 which surrounds a display 164, e.g., a display screen or monitor, although the border 162 may be omitted in some embodiments. In any case, the flexible or semi-flexible computing device 160 is shown in FIG. 3 supported on its underside 163 by the top surface 167 of a table or other suitable structure 165 such that the display screen 164 is oriented upwardly as a playing surface of a conventional board game would be when supported by the top surface 167 of the table or other suitable structure 165. While FIG. 3 illustrates one implementation of the user computing device 104, 106 as a flexible or semi-flexible computing device, it will be understood that in embodiments in which it is desirable to implement the user computing device 104, 106 in the form of a computing device with a display screen (i.e., monitor) that is or may be oriented upwardly in the same manner as a conventional board game supported on a table top or similar structure/surface, the user computing device 104, 106 may be any known computing device capable of such orientation. Examples of such computing devices include, but should not be limited to, a tablet computer or any computer having a flat screen which may be oriented as shown in FIG. 3. In any such embodiment, the display screen 164 may illustratively be or include a conventional touch-screen 166, i.e., an electronic visual display configured to sense or detect the presence, location and shape of an object touching within the touch sensitive area 166 of the display screen 164.

Some conventional board games include a plurality of unique hardware game pieces which are used to identify two or more game players during game play. Well-known examples of such pieces include, but are not limited to, a shoe, a racecar, an iron, a thimble and a top hat. Referring now to FIGS. 3-5, a set 168 of three such unique hardware game pieces 170, 172, 174 is shown with one of the unique hardware game pieces 172 placed in contact with, and supported by, the display screen 164 of the user computing device 160 (see FIG. 3). In the illustrated embodiment, the hardware game piece 170 includes a unique base 176 to which it is mounted, and the hardware game pieces 172 and 174 are likewise mounted to unique bases 178 and 180 respectively. As shown by example in FIG. 5, the bases 176, 178, 180 of the game pieces 170, 172 and 174 respectively are unique in the shapes of their respective footprints. The base 176 of the game piece 170 is formed, for example, in the shape of a triangle, whereas the bases 178 and 180 of the game pieces 172 and 174 are formed in the shape of a circle and a square respectively. It will be understood that while the shape of the footprint of the base 176, 178, 180 of any of the game pieces 170, 172, 174 may be arbitrary, each is sufficiently unique relative to the others to allow the processor 120 of the user computing device 104, 106 to distinguish between the shapes of the various footprints using conventional touch-screen technology.

Thus, with the base 176 of the hardware game piece 172 positioned in contact with the display screen 164 as illustrated in FIG. 3, the processor 120 may determine not only the position of the hardware game piece 172 relative to the surface area of the display screen 164, but may also distinguish the unique shape or footprint of the base 176 of the hardware game piece 172 relative to the unique shapes or footprints of the other hardware game pieces 170 and 174. By so tracking the footprints of the various plurality of unique hardware game pieces, the processor 120 may thus be programmed or configured to automatically track and keep track of the positions of the various players relative to the playing surface of the game board projected or displayed on the display screen of the user computing device 104, 106 during game play. One illustrative process which is made available by the game server 102 to electronic board game developers for tracking and keeping track of the positions of players relative to the playing surface of the electronic game board displayed on the display screen of the user computing device 104, 106 to thereby distinguish one player from another during play of an electronic board game, which process may be executed by one or more of the user computing devices of FIG. 1, will be described in detail below with reference to FIG. 8.

Referring now specifically to FIG. 5, the bases 176, 178, 180 and/or other portion(s) of the hardware game pieces 170, 172, 174 may have attached thereto, or embedded therein, one or more sensors 182, 184, 186 respectively. Examples of such sensors may include, but should not be limited to, proximity sensors, light sensors, noise or sound sensors, tactile sensors, or the like. Alternatively or additionally, the bases 176, 178, 180 and/or other portion(s) of the hardware game pieces 170, 172, 174 may have attached thereto, or embedded therein, one or more actuators 188, 190, 192 respectively. Examples of such actuators may include, but should not be limited to, light sources, sound generators or reproducing devices, body part (e.g., arm, leg or other) movement actuators, vibratory devices, or the like. In embodiments of the hardware game pieces which include one or more sensors and/or one or more actuators, the bases 176, 178, 180 and/or other portion(s) of the hardware game pieces 170, 172, 174 may have attached thereto, or embedded therein, suitable communication devices 194, 196, 198 respectively for communicating sensor data to the processor 120, for communicating actuator control data to the actuators, and/or for communicating with one or more similar communication devices carried by the user computing device 160. Such communication devices 194, 196, 198 may be or include any known wired or wireless communication circuitry and interface, or combination thereof, and may utilize any known communication protocol to carry out communications between the various components.

In some embodiments, the communication devices 194, 196, 198 may be included, regardless of whether the hardware game pieces include one or more sensors and/or actuators, for the purpose of providing a unique identifier to the processor 120. In such embodiments, the footprints of the bases 176, 178, 180 thus need not be physically unique or even different in any way from each other, as the positions of the different hardware game pieces 170, 172, 174 relative to the playing surface of the game board displayed on the display screen of the user computing device 104, 106 during game play may be determined by the processor 120 via the unique identifier produced by the communication device 194, 196, 198 in each hardware game piece. In some such embodiments, the communication devices 194, 196, 198 may be provided in the form of one or more conventional near-field communication (NFC) devices, radio frequency identification (RFID) tags or other suitable wireless data transfer system. In embodiments in which the communication devices 194, 196, 198 are provided in the form of one or more NFC devices, the NFC devices 194, 196, 198 may be programmed with a unique identifier, and one or more NFC devices carried by the user computing device 160 may communicate with the NFC devices 194, 196, 198 in order to determine the identities and/or positions of the hardware game pieces 170, 172, 174. In embodiments in which the communication devices 194, 196, 198 are provided in the form of RFID tags, the RFID tags 194, 196, 198 may each be programmed with a unique identifier signal, and the RFID tags 194, 196, 198 are then operable to transmit for processing by the processor 120 a radio frequency signal unique to that hardware game piece. Those skilled in the art will recognize other forms of the communication devices 194, 196, 198 that may be provided for the purpose of providing a unique identifier to the processor 120, and any such other forms are contemplated by this disclosure. In still other embodiments, the hardware game pieces 170, 172, 174 may be associated with the various players and may be distinguished during game play by capturing images and/or video of the game pieces 170, 172, 174 via the one or more cameras 134, and then processing such images and/or video in a conventional manner to the determine the identities and/or positions of the hardware game pieces 170, 172, 174 according to different visual attributes associated with the game pieces 170, 172, 174, e.g., shape, color, luminosity, footprint, and/or other visual attribute(s).

Figure 6:
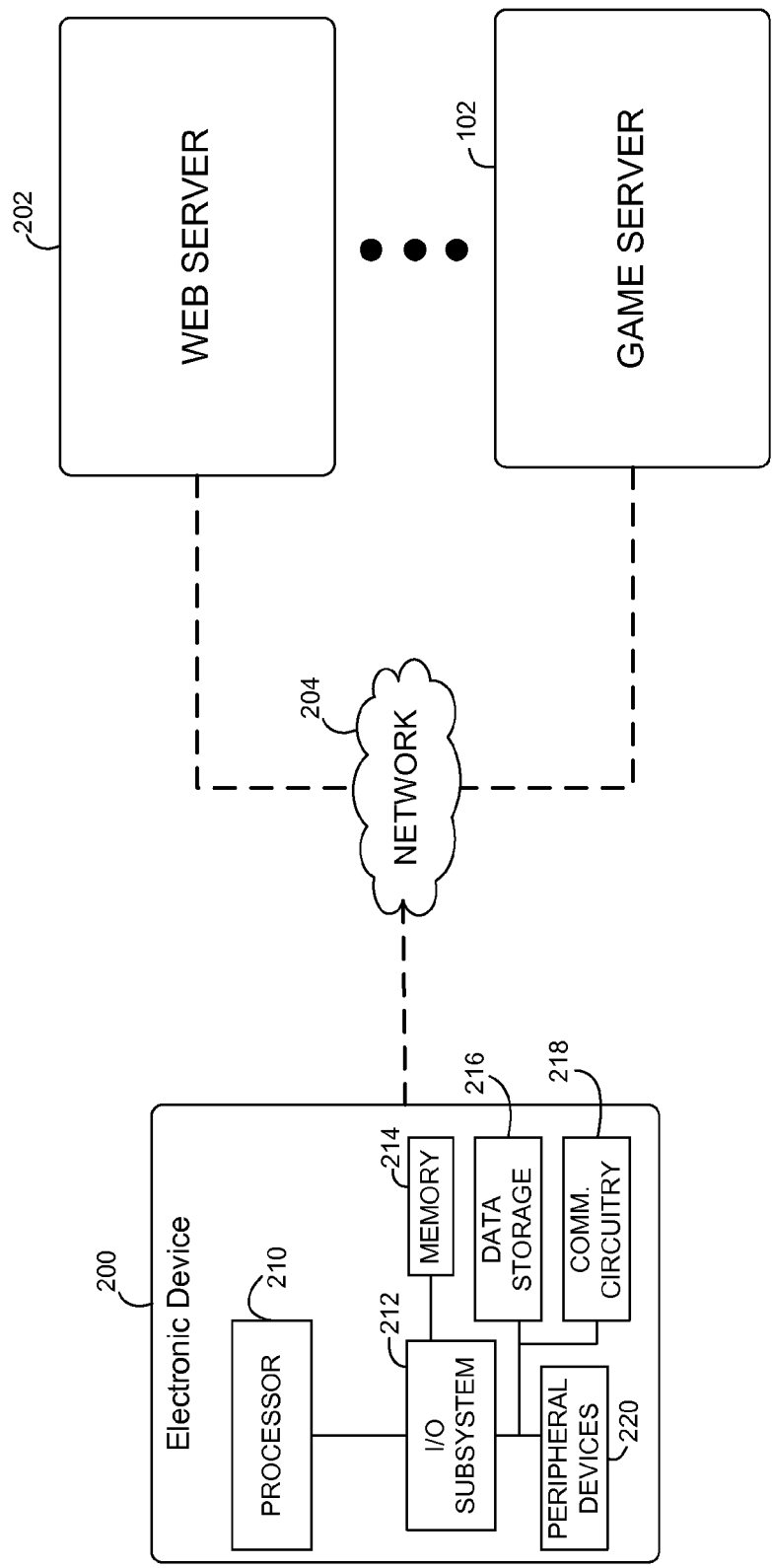
FIG. 6 is a simplified view of at least one embodiment of the one or more electronic devices illustrated in the system of FIG. 1.

As discussed briefly above, a number of electronic devices $110_1$-$110_J$ may be used by one or more players in connection with playing electronic board games with the user computing device 104, and any number of electronic devices $112_1$-$112_K$ may likewise be used by one or more players in connection with playing electronic board games with the user computing device 106, where J and K may each be any positive integer and where J may or may not be equal to K. Any such electronic device $110_1$-$110_J$, $112_1$-$112_K$ may be used in connection with the user computing device 104, 106 for any of a number of purposes, examples of which include, but should not be limited to, downloading one or more virtual game pieces for use during play of one or more electronic board games, and/or as a mechanism for hiding certain game-related information from other players during game play. Referring now to FIG. 6, one illustrative embodiment of an electronic device 200 is shown which may be used for any of the electronic device $110_1$-$110_J$, $112_1$-$112_K$ illustrated in FIG. 1.

In the illustrated embodiment, the electronic device 200 includes a processor 210, an I/O subsystem 212, a memory 214, a data storage 216, a communication circuitry 218, and one or more peripheral devices 220. Such components of the electronic device 200 may be similar to the corresponding components of the user computing device 104, the description of which is applicable to the corresponding components of electronic device 200 and is not repeated herein for clarity of the description.

The communication circuitry 218 of the electronic device 200 may include any number of devices and circuitry for enabling communications between the electronic device 200 and one or more web servers 202 and/or between the electronic device 200 and the game server 102 over a network 204. The network 204 may be or be identical to the network 108 illustrated and described with respect to FIG. 1, or may be or include one or any combination of other conventional networks. The communication circuitry 218 may be configured to use any one or more communication protocols to effect such communication as discussed above with regard to the communication circuitry 128 of the user computing device 104.

In embodiments in which the electronic device 200 is used to download one or more virtual game pieces for use during play of one or more electronic board games, the electronic device 200 may be configured to connect in a conventional manner to one or more suitable web servers 202 hosting corresponding web sites via which such one or more virtual game pieces may be acquired. Alternatively or additionally, the game server 102 may include a library of virtual game pieces, and the electronic device 200 may download any such one or more virtual game pieces via the game server 102. A player may elect to use the virtual game piece in place of a hardware game piece during play of one or more games, and one illustrative process which is made available by the game server 102 to game players for replacing one or more hardware game pieces in any particular electronic board game with corresponding virtual game pieces will be described in detail below with reference to FIG. 10.

In embodiments in which the electronic device 200 is used to download software for use as a mechanism for hiding certain game-related information that is private to each game player from other players during game play, the electronic device 200 may be configured to connect in a conventional manner to the game server 102, and to download any such software via the game server 102. One illustrative process which is made available by the game server 102 to game players for downloading such software for hiding certain game-related information that is private to each game player from other players during game play will be described in detail below with reference to FIG. 11. When downloaded and installed on the electronic device 200, game-related information that is private to each player and that should therefore be kept from exposure or dissemination to other players may be displayed and in some games may be managed or otherwise manipulated via the electronic device 200.

The electronic device 200 may be embodied as any type of computing device capable of performing the functions described herein. For example, each of the electronic device 200 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, a Classmate PC® or other computer developed specifically for use by children, a dedicated, child-friendly thin-client, and/or any other computing device configured to store and access data, and to execute electronic game software and related applications.

Referring now to FIG. 7, in one embodiment, the game server 102 establishes an environment 300 during operation. The illustrative environment 300 includes a game development module 302, a game services module 304 and a game acquisition module 306. Each of the modules 302, 304, 306 may be embodied as any type of software or firmware application configured to communicate with any of the user computing devices 104, 106 and/or the electronic devices $110_1$-$110_J$, $112_1$-$112_K$ during execution. For example, in cloud computing implementations, the modules 302, 304, 306 may be embodied as browser-based applications and/or "thin" client-side applications configured to communicate with corresponding server-side applications executed on a remote server. Alternatively, in other embodiments, the modules 302, 304, 306 may be embodied as stand-alone, full featured applications configured to communicate with any of the user computing devices 104, 106 and/or the electronic devices $110_1$-$110_J$, $112_1$-$112_K$.

The game development module 302 is illustratively provided for, and may be configured to be accessed by, game developers desiring to develop electronic versions of existing board games and/or to develop entirely new electronic board games. In the illustrated embodiment, the game development module 302 includes a number of configuration templates for use as a starting point for developing various features common to many conventional board games. For example, the game development module 302 illustrated in FIG. 7 includes board templates 308, card templates 310, dice templates 312, game currency templates 314, paper piece templates 316 and plastic/metal piece templates 318. The board templates 308 illustratively contains one or more templates of various game board designs which may be downloaded and used by game developers to design game boards for electronic board games. One or more of the game board designs may resemble one or more existing game boards, others may be common to multiple existing board games and still others may be generic designs. The card templates 310 illustratively contain one or more templates of various designs of playing cards, information cards or other cards typically used by board games. One or more of the card designs may resemble cards of one or more existing board games, others may be common to multiple existing board games and still others may be generic designs. The dice templates 312 illustratively contain one or more templates of various die and/or dice designs. One or more of the die or dice designs may resemble die or dice of one or more existing board games, others may be common to multiple existing board games and still others may be generic designs. The game currency templates 314 illustratively contain one or more templates of various designs and/or denominations of game currency. One or more of the game currency designs may resemble currency of one or more existing board games, others may be common to multiple existing board games and still others may be generic designs. The paper piece templates 316 illustratively contain one or more templates of various designs of paper game pieces other than cards. One or more of the paper game piece designs may resemble paper game piece designs of one or more existing board games, others may be common to multiple existing board games and still others may be generic designs. The plastic/metal piece templates 318 illustratively contain one or more templates of various designs of plastic and/or metal game pieces. One or more of the game plastic and/or metal game piece designs may resemble game pieces of one or more existing board games, others may be common to multiple existing board games and still others may be generic designs. It will be appreciated that the final designs of any of the game cards, game die or dice, game currency, paper game pieces and/or plastic and/or metal game pieces developed by game developers may be manufactured as hardware game pieces included with the electronic board games and/or made available to game players separately from the electronic board games. Alternatively or additionally, the final designs of any of the game cards, game die or dice, game currency, paper game pieces and/or plastic and/or metal game pieces developed by game developers may be provided with the electronic games as virtual game pieces and/or be downloadable separately from the electronic board games via one or more web-accessible sources, e.g., the game piece applications library 326 of the game server 102 and/or one or more web sites offering such virtual game pieces for download.

The game development module 302 illustrated in FIG. 7 further includes a hardware game piece identification (ID) sub-module 320 for use by game developers for the purpose of configuring electronic board games to recognize and associate unique hardware game pieces with game players. One illustrative process made available by the game server 102 to game developers for so configuring electronic board games will be described in detail below with reference to FIG. 8. The game development module 302 further illustratively includes a game modification rules sub-module 322 for use by game developers to establish rules for modifying their electronic board games. It is anticipated that electronic board developers may wish to control the extent to which the electronic board games they design may be edited or modified from their original design, and the game modification rules sub-module 322 provides a tool for establishing game modification rules for any electronic board game. One illustrative process made available by the game server 102 to game developers for establishing such game modification rules will be described in detail below with reference to FIG. 9.

The game services module 304 shown in FIG. 7 is illustratively provided for, and may be configured to be accessed by, owners and users (i.e. players) of electronic board games for the purpose of managing electronic board game collections, accessing downloadable virtual game pieces and/or game-related software applications, and enhancing or facilitating game playing opportunities and experiences. In the illustrated embodiment, the game services module 304 includes a downloadable game management program 324, a game piece applications library 326, a private game component sub-module 328, a remote player(s) game service 330, a game recommendation service 332 and a game policy service 334. The downloadable game management program 324 illustratively contains an electronic game management software program that may be downloaded from the game server 102 and installed on a user computing device 104, 106 and/or electronic device $110_1$-$110_J$, $112_1$-$112_K$. Upon installation, the game management program allows users to download, save, organize and configure and play electronic board games. Illustratively, the game management program may include a sub-module that allows users to connect directly to the game acquisition module 306 to browse, search for and acquire electronic board games from the game server 102.

The game piece applications library 326 illustratively includes a number of downloadable software program applications for virtual game pieces. The game management program may further include a sub-module that allows users to connect directly to the game piece applications library 326 so that users may browse, search for and download virtual game pieces from the game server 102. In any case, the game piece applications library 326 may be accessed by a user computing device 104 and/or an electronic device $110_1$-$110_J$, $112_1$-$112_K$, and one or more virtual game pieces may be downloaded thereto from the game piece applications library 326. Upon installation, such one or more virtual game pieces may be activated and used during play of electronic board games. One illustrative process which is made available by the game server 102 to game players for replacing one or more hardware game pieces in any particular electronic board game with one or more corresponding virtual game pieces will be described in detail below with reference to FIG. 10.

The private game component sub-module 328 illustratively includes a number of downloadable software program applications, with one or more such software program applications associated with one or more electronic board games for the purpose of maintaining some game-related information that is private to each player from exposure or dissemination to other players during game play. The game management program and/or the game acquisition module 306 may further include a sub-module which directs users acquiring electronic board games that require some game-related information that is private to each player to be kept from exposure or dissemination to other players during game play to the private game component sub-module 328 so that users may download from the game server 102 and install on one or more of the electronic devices $110_1$-$110_J$, $112_1$-$112_K$ one or more private information software applications appropriate for the electronic board game being acquired. In some embodiments and/or with some electronic board games, a single, private information software application will be downloaded and installed on a single electronic device $110_1$-$110_J$, $112_1$-$112_K$, and the single electronic device $110_1$-$110_J$, $112_1$-$112_K$ will be passed around to the various players of the electronic board game during game play. In such embodiments, the single, private information software application will be configured to display the game-related information that is private to each player, and to provide for access, management and/or manipulation of such information by each such player, via single, electronic device $110_1$-$110_J$, $112_1$-112K, and to also allow the various game players to hide or mask their private information before passing the single electronic device $110_1$-$110_J$, $112_1$-$112_K$ to the next player. In other embodiments and/or with other electronic games, each player will have a different electronic device $110_1$-$110_J$, $112_1$-$112_K$, and in such embodiments a private information software application may be downloaded and installed on each such different electronic device $110_1$-$110_J$, $112_1$-$112_K$. During subsequent play of the associated electronic board game, the game-related information that is private to each player will be displayed and may be accessed, managed and/or manipulated by each such player only via that player's electronic device $110_1$-$110_J$, $112_1$-$112_K$. In any case, the private game component sub-module 328 may be accessed by a user computing device 104 and/or an electronic device $110_1$-$110_J$, $112_1$-$112_K$, and one or more of the private information software applications appropriate for the electronic board game being acquired may be downloaded thereto from the private game component sub-module 328. Upon installation on one or more of the electronic devices $110_1$-$110_J$, $112_1$-$112_K$, such one or more private information software applications may be activated and used during play of electronic board games.

With some electronic board games, one or more hardware game pieces may be available via which game-related information that is private to the various players may be kept from exposure or dissemination to other players during game play. With such electronic board games, players may be offered a choice between such one or more hardware game pieces or the one or more private information software applications for use during game play. One illustrative process which is made available by the game server 102 to game players for selecting between such one or more hardware game pieces and one or more private information software applications will be described in detail below with reference to FIG. 11.

The remote player(s) game service 330 illustratively provides a link or portal via which multiple players, some or all of which may located remotely from each other, may play one or more electronic board games. In one embodiment, the remote player(s) game service 330 further provides one or more downloadable software program applications which may be downloaded and installed by users to enable one or more electronic board games to be played remotely and/or to facilitate such remote game play. Such one or more downloadable software application programs may be configured to enable and/or facilitate synchronous remote game play, i.e., one or more game participants located remotely from other game participants with all participants playing the electronic board game at the same time, and/or may be configured to enable and/or facilitate asynchronous remote game play, i.e., one or more game participants located remotely from other game participants with each player taking a turn and then waiting for the next player to do so. Asynchronous game play may occur continuously and/or may occur in blocks of game activity with periods of inactivity between such blocks of activity. The game management program and/or the game acquisition module 306 may further include a sub-module or link which directs users to the remote player(s) game service 330. In any case, the remote player(s) game service 330 may be accessed by any of the user computing devices 104, 106, and any one or more software application programs which enable and/or facilitate remote game play may be downloaded thereto from the remote player(s) game service 330. Upon installation, such one or software application programs may be activated to enable and/or facilitate remote play of one or more electronic board games.

The game recommendation service 332 illustratively provides access to one or more game recommendation applications configured, upon user request, to process a user's electronic board game collection along with at least a first criterion and recommend one or more games in the user's collection of games to play, and/or to access and process electronic board games not in the user's electronic board game collection along with at least the first or a second criterion different from the first criterion and recommend one or more such electronic board games not in the user's collection of electronic board games to play. The game management program and/or the game acquisition module 306 may further include a sub-module or link which directs users to the game recommendation service 332. In one embodiment, the one or more game recommendation applications are under the control of the game server 102 and therefore executed by the processor 140. Alternatively or additionally, at least one of the one or more game recommendation applications and/or one or more components thereof, may be executable by a processor of the user computing device 104, 106 and/or an electronic device $110_1$-$110_J$, $112_1$-$112_K$, and may therefore be downloaded from the game recommendation service and/or the game acquisition module 306 and installed on the user computing device 104, 106 and/or electronic device $110_1$-$110_J$, $112_1$-$112_K$. Upon installation on a user computing device 104, 106 and/or on one or more of the electronic devices $110_1$-$110_J$, $112_1$-$112_K$, such one or more game recommendation applications may be activated and used to request game recommendations. One illustrative process which is made available by the game recommendation service 332 to electronic board game users for requesting and obtaining recommendations of one or more electronic board games to play from the user's collection of electronic board games, or of one or more electronic board games to play that is/are not in the user's collection of board games, will be described in detail below with reference to FIG. 12.

The game policy service 334 illustratively provides user access to one or more game access limit applications configured, upon user request, to limit access to one or more of the electronic board games in the user's collection of electronic board games. Example access limits which may be imposed by the user on one or more of the electronic board games in the user's collection of electronic board games may include, but are not limited to, a time limit on continuous play of one or more electronic board games in the user's collection, a time limit on the total time in any one day or other block of time which one or more electronic board games in the user's collection may be played, one or more time blocks during which play of one or more electronic board games in the user's collection may or may not be played, and restricted access to one or more electronic board games in the user's collection. The game management program and/or the game acquisition module 306 may further include a sub-module or link which directs users to the game policy service 334. In one embodiment, the one or more game access limit applications are under the control of the game server 102 and therefore executed by the processor 140. Alternatively or additionally, at least one of the one or more game access limit applications and/or one or more components thereof, may be executable by a processor of the user computing device 104, 106 and/or an electronic device 110$_1$-110$_J$, 112$_1$-112$_K$, and may therefore be downloaded from the game policy service and/or the game acquisition module 306 and installed on the user computing device 104, 106 and/or electronic device 110$_1$-110$_J$, 112$_1$-112$_K$. Upon installation on a user computing device 104, 106 and/or on one or more of the electronic devices 110$_1$-110$_J$, 112$_1$-112$_K$, such one or more game access limit applications may be activated and used to set one or more access limits to one or more of the electronic board games in the user's collection of electronic board games. One illustrative process which is made available by the game policy service 334 to electronic board game users for setting one or more access limits to one or more electronic board games in the user's collection of electronic board games will be described in detail below with reference to FIG. 13.

The game acquisition module 306 shown in FIG. 7 is illustratively provided for, and may be configured to be accessed by, users (i.e. players) of electronic board games for the purpose of acquiring one or more electronic board games to play and/or for the purpose of uploading modified versions of electronic board games for use by others. In the illustrated embodiment, the game acquisition module 306 includes a licensing and use rights information sub-module 336, an electronic board game download manager 338 and a modified electronic board game upload manager 340. The licensing and use rights information sub-module 336 illustratively contains legal information relating to licensing and use rights associated with the various versions of electronic board games acquired and/or uploaded by users from or to the game acquisition module 306. In one embodiment, such information is displayed to users via the user computing device 104, 106 and/or electronic device 110$_1$-110$_J$, 112$_1$-112$_K$ upon acquisition and/or upload of each electronic board game acquired or uploaded by a user. Alternatively or additionally, such information may be provided as a selectable feature of the game management program that may be accessed by a user at any time.

The electronic board game download manager 338 provides for the acquisition, e.g., via download, of any of various versions of one or more electronic board games. In one embodiment, an electronic board game is selected using the game management program as discussed above, and the game management program illustratively directs the user to the electronic board game download manager 338. Alternatively or additionally, a user may find one or more electronic board games to acquire via one or more websites hosted on one or more of the web servers 202 or other server(s). Alternatively or additionally still, a user may download one or more electronic board games from one or more local storage media such as one or more CD ROMs, one or more so-called memory sticks or thumb drives, e.g., portable data storage devices with flash or other memory and/or with a universal serial bus (USB) or other drive interface, or the like. In any case, the one or more electronic board games may typically be downloaded, e.g., in the form of one or more executable software programs, by any suitable means into the memory 124 and/or data storage 126 of the user computing device 104, 106, and may be accessed by users, e.g., via the game management program or other game selection mechanism, and activated for play by the user in a conventional manner. When activated, the processor 120 executes the one or more executable software programs of the electronic board game software such that the user and/or one or more other players may play the electronic board game.

In the illustrated embodiment, a user may download any of at least three different versions of a selected electronic board game; a full and complete version, e.g., having no feature, other restrictions to play thereof, a limited version and/or a modifiable version. In one embodiment, the full and complete version carries the highest monetary cost to the user in return for ownership of the electronic board game with no limits, restrictions or other conditions. In some alternative embodiments, however, the modifiable version may instead carry the highest monetary cost to the user in return for modification rights to the electronic board game.

In one embodiment, the limited version is the full and complete version that may be played for only a limited duration, e.g., for a limited time period, e.g., days, weeks, other definable block of time, for a limited number of times, e.g., 10 times, or the like. Alternatively or additionally, the limited version may be a so-called "lite" version in which access to one or more features or operations of the electronic board game is/are disabled or otherwise restricted. For limited versions which may be played only for a limited duration, access to the limited version may be disabled upon expiration of the limited duration, and in some embodiments further access to the limited version may be extended upon payment for such additional access. The limited version illustratively carries the lowest monetary cost to the user since the user effectively leases this version and/or does not have access to all of the features and/or operations of the electronic board game. In return for this limited or restricted access, users may thus test drive electronic board games more cheaply than by purchasing the full and complete version, thereby providing electronic board game users with the ability to experience the game before committing to purchase of the full/complete, and therefore more expensive, version. Any such limited version may alternatively or additionally include other features that are not necessarily associated with the game, such as one or more advertisements for other games, game pieces, etc. or other items. Any such other features may be or include any one or more of image, video, animation and audio content.

Acquisition of the modifiable version may carry more or less monetary expense to the user, as described above, and in any case represents a version of the electronic board game that the user may modify. As discussed above, the developer of an electronic board game may limit the number and/or type(s) of features of the electronic board game that may be modified, or may disable any and all modifications to the electronic board game. One illustrative process which is made available by the game download manager 338 to electronic board game users for acquiring one or more versions of one or more electronic board games will be described in detail below with reference to FIG. 14.

In versions of an electronic board game in which the electronic board game developer permits modifications thereto, the user acquiring such a modifiable version may make modifications, as permitted by the game developer, and may save the modified version in the memory 124 and/or data storage 126 of the user computing device 104, 106 for future use, i.e. future play. In some embodiments, the game developer may charge different fees for different modifiable versions, i.e., different fees for different limits on the modifiability of the game and/or different fees for different uses of the modifiable version of the game, e.g., modified for personal use only, modified for distribution to others, etc. Illustratively, the user may further utilize the modified game upload manager 340 to upload the user-modified version of the electronic board game to the game server 102 for download and use by others, and in some embodiments may elect to either allow others to download and use the user-modified version for free or charge a fee for download and use of the user-modified version. In the latter case, the developer of the original electronic board game may require a share of the revenue from sales of user-modified version of the electronic board game, and the amount of this share may vary depending upon the degree or extent of modifications allowed by the game developer to the electronic board game. Illustratively, the user may be required to agree to the revenue share dictated by the game developer before uploading of the user-modified electronic board game is permitted. The user may instead elect not to share the dictated revenue amount with the game developer, in which case the user will not be permitted to upload the user-modified version of the electronic board game to the game server 102 for sale to others. The user may illustratively have the option, in such cases, to upload the user-modified version of the electronic board game to the game server 102 for free use by others. In any case, the modified game upload manager 340 may be or include conventional software and/or firmware which manages and carries out uploading of one or more executable software programs that defined the user-modified version of the electronic board game. One illustrative process which is made available by the modified game upload manager 340 to electronic board game users for uploading one or more user-modified versions of one or more electronic board games will be described in detail below with reference to FIG. 15.

Figure 8:
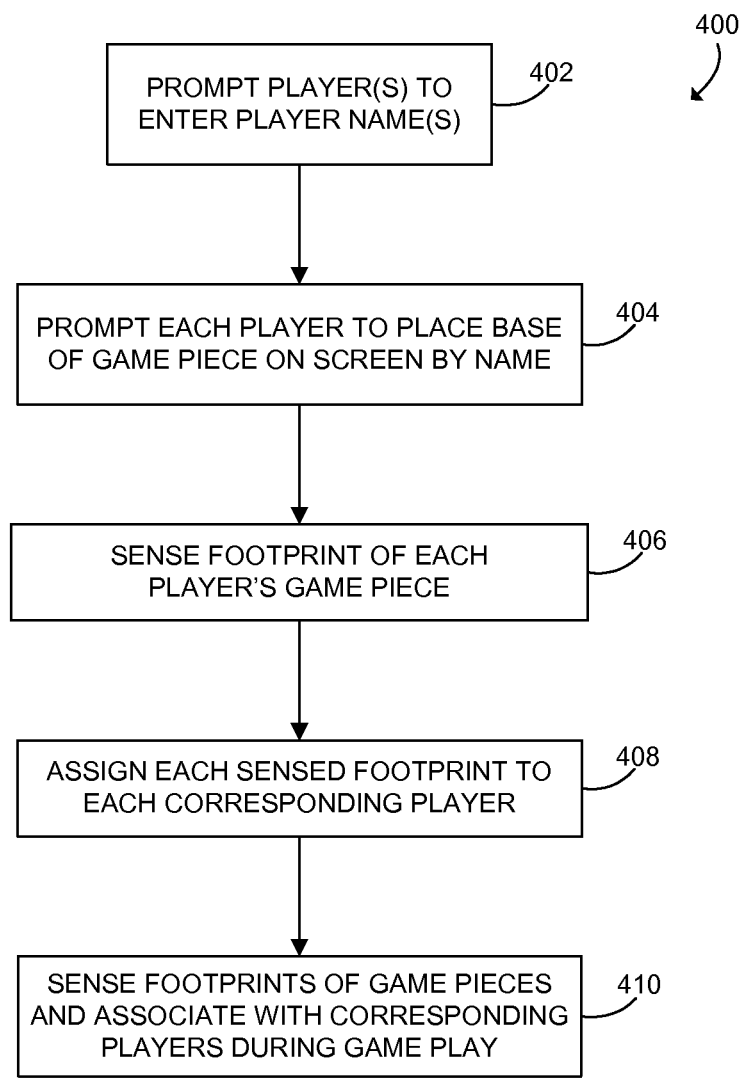
FIG. 8 is a simplified flow diagram of at least one embodiment of a process for identifying and tracking of the positions of players relative to the playing surface of an electronic game board displayed on a display screen of a user computing device, which process may be executed by one or more of the user computing devices of FIG. 1.

Referring now to FIG. 8, a simplified flow diagram is shown of one illustrative process 400 which is made available by the game server 102 to electronic board game developers for tracking and keeping track of the positions of players relative to the playing surface of an electronic game board displayed on the display screen of the user computing device 104, 106 to thereby distinguish one player from another during play of an electronic board game. The process 400 may be executed by the processor 120 of one or more of the user computing devices 104, 106 used during development and/or design of an electronic board game. The process 400 assumes that each of one or more game players will have in their possession a unique hardware game piece which is to be assigned to that player and which will be recognized after execution of the process 400 by the user computing device 104, 106 during play of the electronic board game. In the embodiment of the process 400 illustrated in FIG. 8, the uniqueness of such hardware game pieces is illustratively defined by the shapes or footprints of their bases as illustrated and described hereinabove with respect to FIGS. 3-5.

The process 400 begins at block 402 where the processor 120 prompts the one or more players to enter their name(s), e.g., in player name field(s) displayed on the display 132. The processor 120 illustratively determines from the player names entered at block 402 the total number of players playing the game. Thereafter at block 404 the processor 120 prompts each player to place the base of that player's unique hardware game piece on the display 132 by or against that player's name displayed on the 132. Thereafter at block 406, the processor 120 senses, e.g., via touch screen, camera image or video, the footprint of player's unique hardware game piece. At block 408, the processor 120 assigns each of the sensed footprints to a corresponding player, e.g., by associating the sensed footprint of player's unique hardware game piece with the displayed name by or against which the base of player's unique hardware game piece was placed at block 404. Thereafter at block 410, the processor 120 senses the footprints of each of the unique hardware game pieces and associates the sensed footprints with corresponding players to which the sensed footprints are assigned to thereby distinguish the various players from each other and to also determine positions of the various players relative to the surface of the electronic board game displayed on the display 132 during game play.

In other embodiments, as described above, the uniqueness of the various hardware game pieces may be defined by a communication device, e.g., an NFC device or an RFID tag or other communication device, attached to or embedded within the base or other portion of each of the various hardware game pieces. In such embodiments, the process 400 may be modified such that block 404 requires each player to select his or her name on the display screen, e.g., by touching his or her name on the display screen (which may, for example, cause that person's name to be highlighted), and to then bring his or her hardware game piece into proximity with the user computing device 104, 106 which is executing the electronic board game, e.g., by placing the player's hardware game piece anywhere on the surface of the display 132, while other players keep their game pieces sufficiently away from the user computing device 104, 106 to avoid sensing by the user computing device 104, 106 of such other game pieces. Block 406 may also be modified to require sensing of a player's unique hardware game piece by sensing the unique signal produced by the communication device carried by the player's hardware game piece. In some embodiments, such communication signals may be further distinguishable from communication signals produced by the other hardware game pieces by requiring conventional "pairing," as this term is generally understood in the context wireless communication protocol, e.g., Bluetooth® and other such communication protocols, between the communication devices of the hardware game pieces and the communication circuitry 128 of the user computing device 104, 106 to thereby establish secure communication channels between the processor 120 and each of the various hardware game pieces. In any case, block 408 may be modified to require the processor 120 to assign the unique signal produced by the player's communication device to that player, and block 410 may be modified to require the processor 120 to distinguish players from one another by sensing and distinguishing between the various unique communication signals produced by the communication devices carried by or embedded within the player's hardware game pieces.

Figure 9:
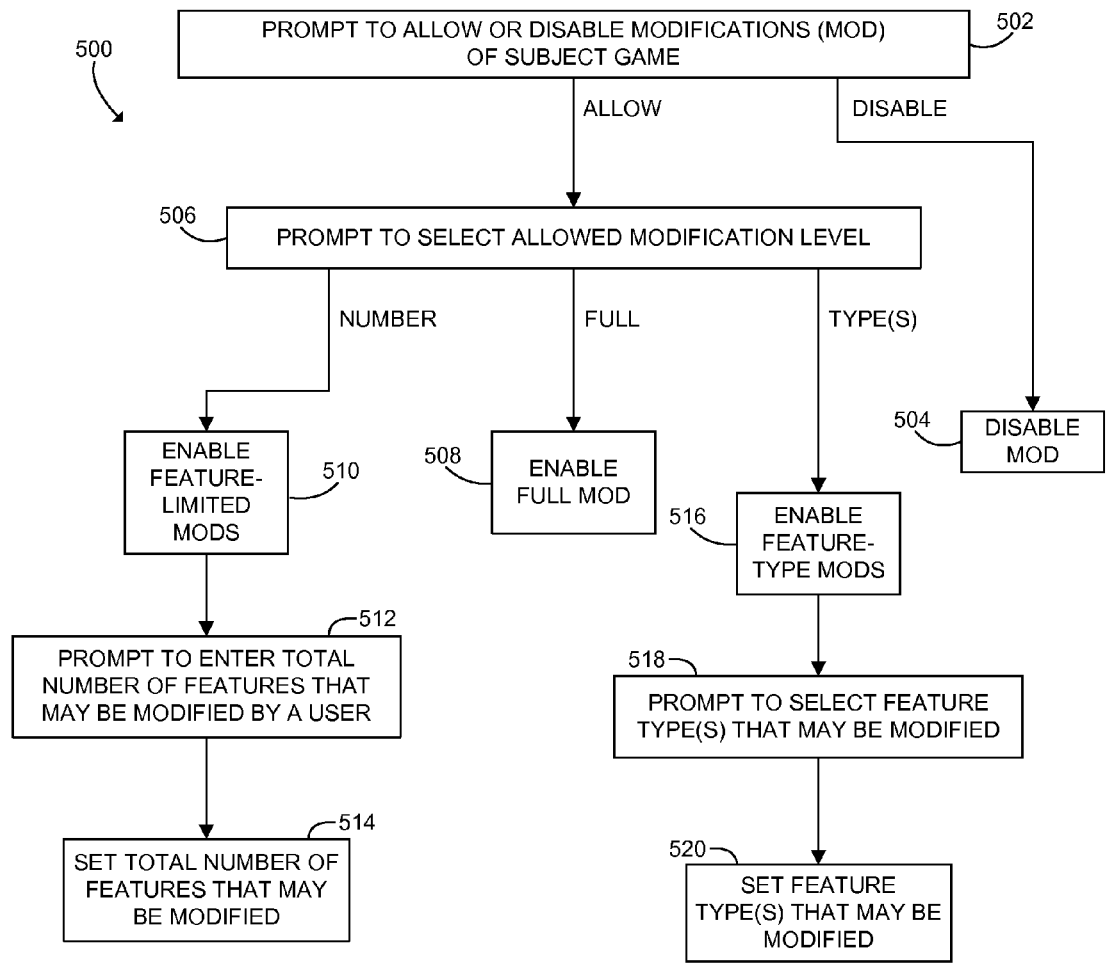
FIG. 9 is a simplified flow diagram of at least one embodiment of a process for setting game modification rules by a game developer, which may be executed by the game server of FIG. 1 and/or by a computing device controlled by the game developer.

Referring now to FIG. 9, a simplified flow diagram is shown of one illustrative process for use by electronic board game developers to set rules for modification by users of electronic board games designed and/or developed by the electronic board game developers. The process 500 may be executed by the processor 140 of the game server 102 and/or by the processor 120 of a user computing device 104, 106 or other computing device controlled by an electronic board game developer during the design and/or development of an electronic board game. For purposes of facilitating an understanding of FIG. 9, the process 500 will be described as being executed by the processor 120 of a user computing device 104, 106. The process 500 begins at block 502 where the processor 120 prompts the game developer, e.g., by controlling the display 132 of the user computing device 104, 106 to display a suitable message, to allow or disable modifications of the subject electronic board game. If the game developer elects to disable modifications to the subject game, the process 500 advances to block 504 in which the processor 120 disables modifications to the subject game (e.g., the processor 120 may set a game modification indicator to indicate that no modifications are allowed). If the game developer otherwise elects to allow modifications to the subject game, the process 500 advances from block 502 to block 506 where the processor 120 prompts the user to select the level of allowed modifications (e.g., permit full editing of the subject game, restrict modifications of the game to a total number of features that may be modified by a user, or restrict modifications of the game to one or more types of modifiable features). If the game developer elects to permit full editing of the subject electronic board game, e.g., meaning that any user of the subject electronic board game may modify any feature of the subject electronic board game, the process 500 advances from block 506 to block 508 in which the processor 120 enables full modification of the subject game (e.g., the processor may set the game modification indicator to signify any user of the subject electronic board game may modify any feature of the subject electronic board game).

If the game developer elects to restrict modifications of the game to a total number of features that may be modified by a user, e.g., meaning that user modifications to the subject electronic board game are allowed but are restricted to a maximum number of modifications that may be made to the subject the electronic board game by any one user, the process 500 advances from block 506 to block 510 in which processor enables feature-limited modification to the subject game (e.g., the processor may set the game modification indicator to signify that modifications to the subject game by any one user are limited to a maximum number of modifications). Thereafter, at block 512, the processor 120 prompts the game developer to enter the total (maximum) number of features of the subject electronic board game which may be modified by any one user of the game. At block 514, the processor 120 sets the total number of features of the subject electronic board game which may be modified as specified by the game developer in response to the prompt at block 512 (e.g., the processor 120 may set a feature number indicator to the number of modifiable features).

If the game developer elects to restrict modifications of the game to one or more types of features that may be modified by a user, e.g., meaning that user modifications to the subject electronic board game are allowed but are restricted to modifications only of one or more specified types of features of the subject the electronic board game, the process 500 advances from block 506 to block 516 in which the processor enables feature-type modification of the subject game (e.g., the processor may set the game modification indicator to signify that modifications to the subject game by any one user are limited to modifications only of one or more specified types of game features). Thereafter at block 518, the processor 120 prompts the game developer to specify the one or more types of features of the subject electronic board game which may be modified, e.g., by displaying a list of features types and allowing the game developer to select one or more of the feature types in the displayed list. Thereafter at block 520, the processor 120 sets the feature type(s) that may be modified as specified by the game developer in response to the prompt at block 518 (e.g., the processor 120 may set a feature type indicator to the one or more feature types that may be modified). Illustratively, the feature types that may be modified may include any type of feature of the subject electronic board game. Examples include, but should not be limited to, one or more game rules or sets of game rules, appearance (e.g., color, shape, size, etc.) of the game board and/or any game component, amount and/or type of game currency, content of one or more game cards or sets of cards, content of one or more landing spaces on the game board, and the like.

Figure 10:
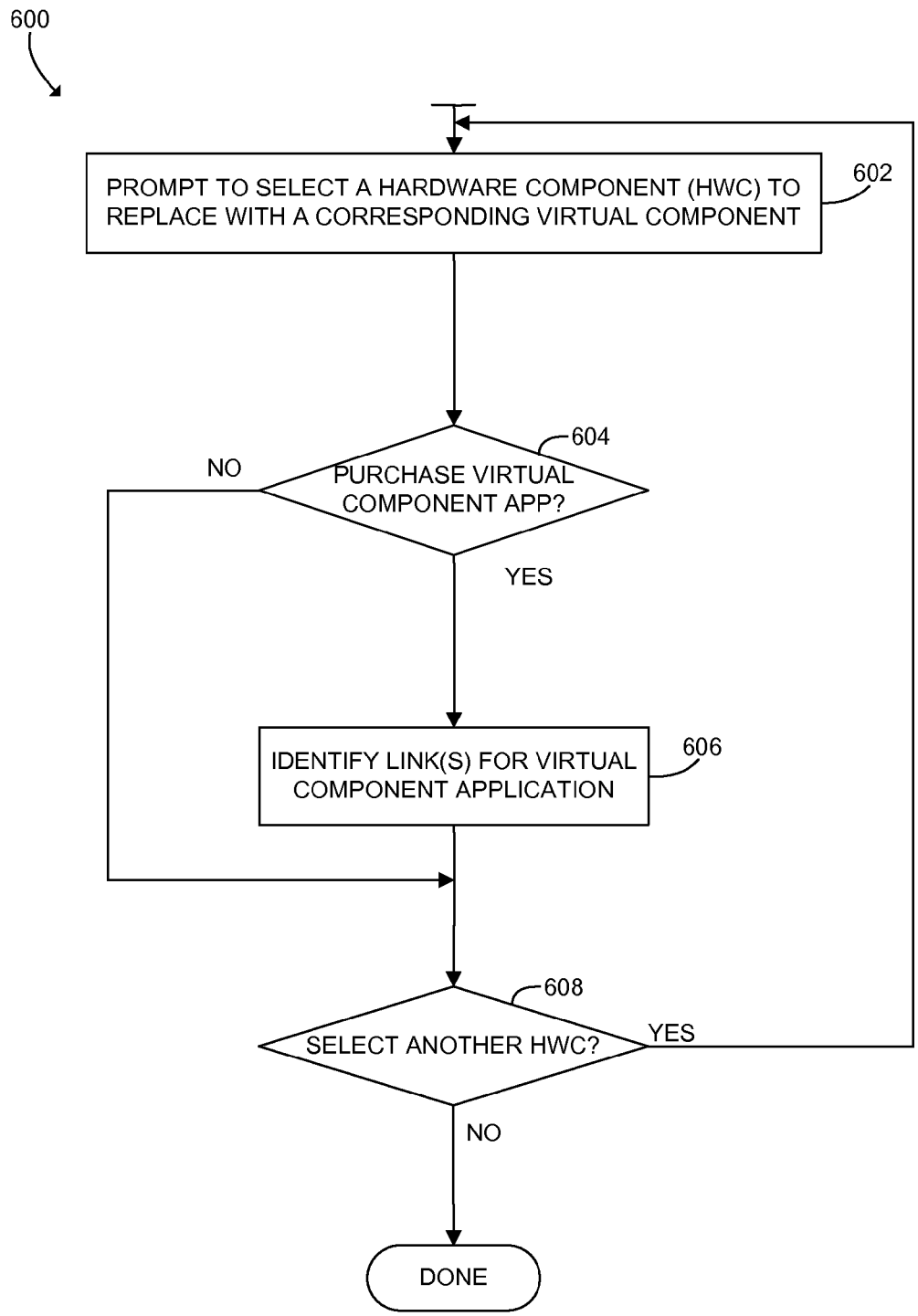
FIG. 10 is a simplified flow diagram of at least one embodiment of a process for selecting one or more electronic game components to use in place of one or more corresponding hardware game components when playing games, which may be executed by one or more of the user computing devices of FIG. 1.

Referring now to FIG. 10, a simplified flow diagram is shown of one illustrative process 600 which is made available by the game server 102 to game players for replacing one or more hardware game pieces in any particular electronic board game in the user's collection of electronic board games with one or more corresponding virtual game pieces. The process 600 may be executed by the processor 140 of the game server 102 and/or by the processor 120 of a user computing device 104, 106. For purposes of facilitating an understanding of FIG. 10, the process 600 will be described as being executed by the processor 120 of a user computing device 104, 106. The process 600 may illustratively be provided to users as a selectable option within the game management program and/or as a selectable option when activating any of the one or more electronic board games in the user's collection of electronic board games. In any case, the process 600 begins at block 602 where the processor 120 prompts the user, e.g., via control of the display 132 of the user computing device 104, 106, to select a hardware component (HWC) to replace with a corresponding virtual component. The processor 120 may execute the block 602, e.g., by controlling the display 132 of the user computing device 104, 106 to display a list of the different hardware game pieces or components usable in the subject electronic board game.

When the user selects a hardware component at block 602, the process 600 advances to block 604 in which the processor 120 determines whether the user desires to purchase a virtual component application, e.g., from the game piece applications library 326. If the user does not desire or need to purchase a virtual component application (e.g., the user already has a corresponding virtual component application, the user has previously downloaded a suitable virtual component application for the selected hardware component, etc.), the process 600 advances to block 608 described below. However, if the user elects to purchase a corresponding virtual component application, the process 600 advances from block 604 to block 606 where the processor 120 identifies a link for purchase of the virtual component application, e.g., from the game piece applications library 326 or other source, and/or identifies one or more links for a number of different virtual versions or variations of the HWC application, e.g., from the game piece applications library 326 or other source. Illustratively, the processor 120 may execute block 606 by controlling the display 132 to display the link on the display 132, and/or to display one or more links for a number of different virtual versions or variations of the HWC application, in the game piece library or other source.

When the user selects the link or links, the processor 120 illustratively directs the process 600 to the game piece applications library 326 or other source where the user may purchase a virtual component application corresponding to the selected HWC. In any case, if the user elects at block 604 to skip the purchase block 606, and after execution of the purchase block 606, the process 600 advances to block 608 where the processor 120 prompts the user to select another hardware component to replace with a corresponding virtual component or to exit the process 600. If the user elects to select another hardware component to replace with a corresponding virtual component, the process 600 loops back to block 602, and the process 600 otherwise terminates.

Figure 11:
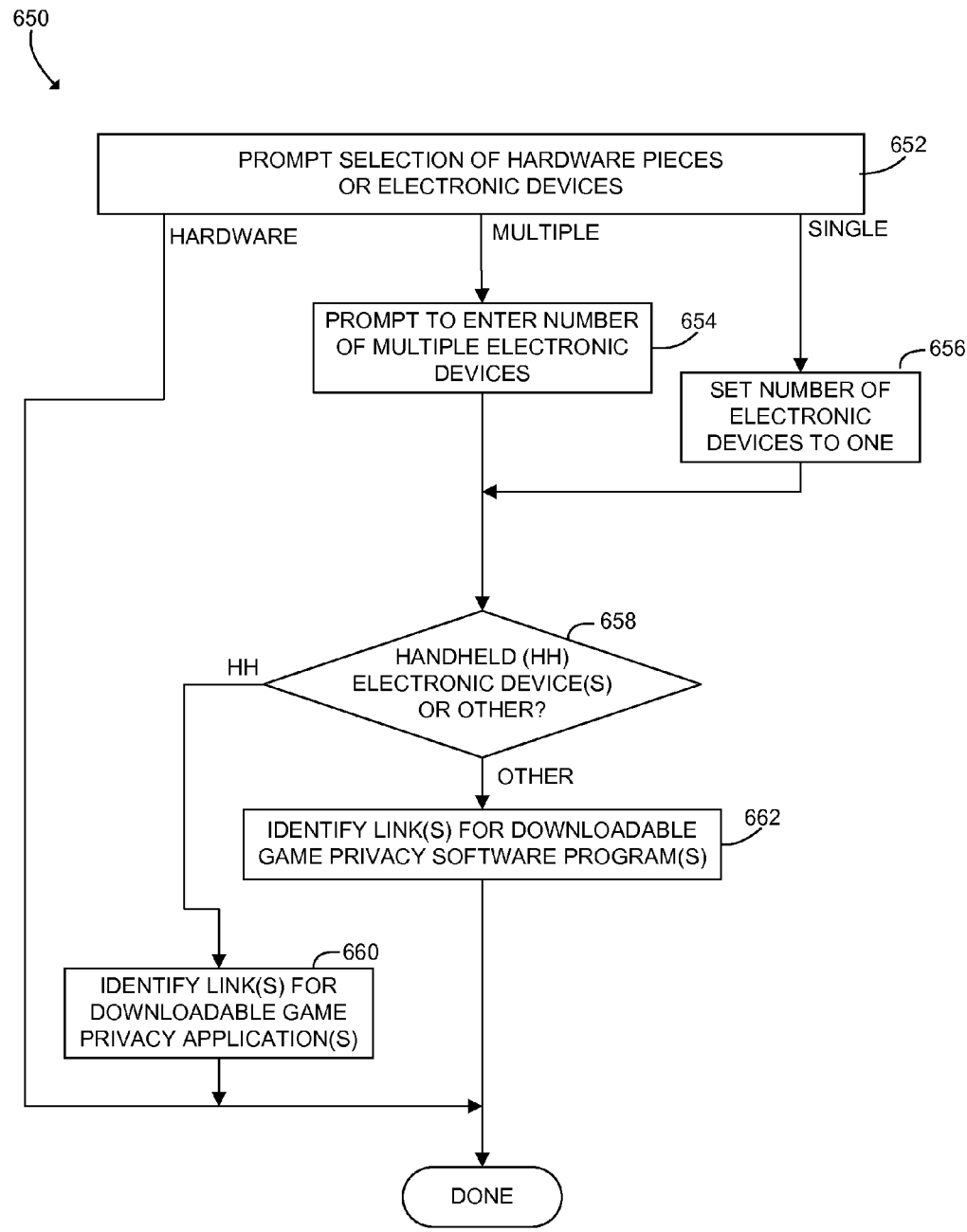
FIG. 11 is a simplified flow diagram of at least one embodiment of a process for selecting a mechanism for hiding certain game-related information from other players during game play, which may be executed by one or more of the user computing devices of FIG. 1.

Referring now to FIG. 11, a simplified flow diagram is shown of at least one embodiment of a process 650 for selecting a mechanism for hiding private, game-related information from other players during game play. The process 650 may be executed by the processor 140 of the game server 102 and/or by the processor 120 of a user computing device 104, 106. For purposes of facilitating an understanding of FIG. 11, the process 650 will be described as being executed by the processor 120 of a user computing device 104, 106. The process 650 may illustratively be provided to users as a selectable option within the game management program and/or as a selectable option when activating any of the one or more electronic board games in the user's collection of electronic board games. In any case, the process 650 begins at block 652 in which the processor 120 prompts, e.g., via control of the display 132 of the user computing device 104, 106, to allow the players to select to play the game using one or more hardware game pieces, multiple electronic devices, or a single electronic device to keep at least some of the game information private, i.e., to hide private, game-related information from other players during game play. If the players elect to play the game using multiple electronic devices, e.g., one for each player, to hide private game-related information from other players during game play, the processor 120 prompts to enter the number of multiple electronic devices that will be used to hide the private game-related information from other players at block 654, and one of the players responds by entering a corresponding integer number. If the players, at block 652, elect to play the game using only a single electronic device, e.g., one that will be passed around or otherwise used by each of the players of the game, to hide private game-related information from other players during game play, the processor 120 sets the number of electronic device to one in block 656.

Following execution of the block 654 or the block 656, the process 600 advances to block 658 where the processor 120 prompts to identify the type of electronic device(s) that will be used, e.g., as between one or more hand-held (HH) electronic devices and one or more other electronic devices. If one of the players selects hand-held (HH), the process 600 advances to block 660 in which the processor 120 identifies one or more links, e.g., by controlling the display 132 to display the one or more links for one or more versions of the downloadable game privacy application(s) suitable for the number of handheld electronic devices. Illustratively, at least one of the one or more displayed links may be a link to one or more such suitable applications contained in the game piece applications library 326, the private game component submodule 328 or other suitable library or website accessible by the user computing device 104, 106.

If one of the players selects "other" electronic devices at block 658, the process 600 advances to block 662 where the processor 120 identifies one or more links, e.g., by controlling the display 132 to display the one or more links for one or more versions of the downloadable game privacy software program(s) suitable for the number of electronic devices other than handheld devices. Illustratively, at least one of the one or more displayed links may be a link to one or more such suitable software programs contained in the game piece applications library 326, the private game component submodule 328 or other suitable library or website accessible by the user computing device 104, 106. The process 650 terminates following execution of either of the blocks 660 or 662.

Figure 12:
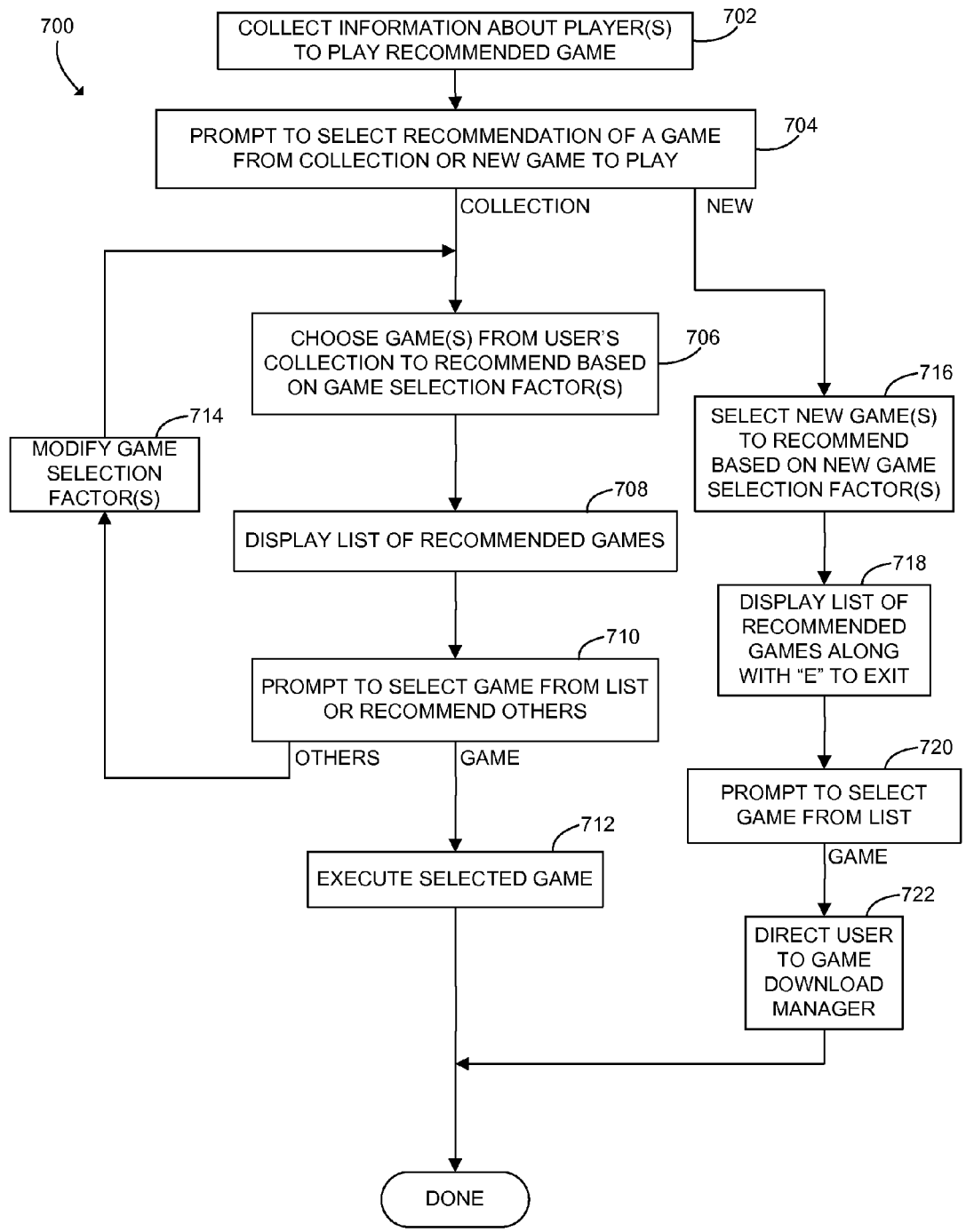
FIG. 12 is a simplified flow diagram of at least one embodiment of a process for recommending a game to a user from the user's collection of games and/or from a catalogue of new games, which may be executed by one or more of the user computing devices and/or the game server of FIG. 1.

Referring now to FIG. 12, a simplified flow diagram is shown of at least one embodiment of a process 700 for recommending an electronic board game to a user from the user's collection of electronic board games and/or from a catalogue or library of new games. The process 700 may be executed by the processor 140 of the game server 102 and/or by the processor 120 of a user computing device 104, 106, and is illustratively made available to users via the game recommendation service 332 of the game services module 304. For purposes of facilitating an understanding of FIG. 12, the process 700 will be described as being executed by the processor 120 of a user computing device 104, 106. The process 700 may illustratively be provided to users as a selectable option within the game management program and/or as a separate service which users may join separately from the game management program. In any case, the process 700 begins at block 702 where the processor 120 collects information about the player or players of an electronic board game that will be recommended by the process 700. In one embodiment, the processor 120 executes the block 702 by prompting the user, e.g., via control of the display 132 of the user computing device 104, 106, for information about the player or players of an electronic board game that will be recommended by the process 700. In one embodiment, the information may include only the total number of players that will be playing the game to be recommended, although other embodiments are contemplated in which alternate or additional information about the identified and/or potential game players may be requested or provided. Examples include, but are not limited to, one or more of the names, ages and genders of one or more of the identified and/or potential players, skill level(s) of one or more of the identified and/or potential players, identifications, e.g., usernames, within the game recommendation service 332 of one or more of the identified and/or potential players, time of day at one or more of the identified and/or potential player's location, geographic location of one or more of the identified and/or potential players and/or personal information about one or more identified and/or potential players, and the like. In other embodiments, the processor 120 collects the player information by automatically sensing as potential players electronic devices proximate to the user computing device 104, 106, and/or by automatically determining as potential players a list of users/players currently logged into one or more remote electronic board game playing websites or portals.

Following block 702, the process 700 advances to block 704 where the processor 120 prompts the user, e.g., via control of the display 132 of the user computing device 104, 106, to select the recommendation of an electronic board game from the user's collection of electronic board games or the recommendation of a new electronic board game to play, e.g., one that is not in the user's collection of electronic board games. If the user elects at block 704 to obtain a recommendation of an electronic board game from the user's collection of electronic board games, the process 700 advances to block 706 where the processor 120 chooses one or more games to recommend to the user based on one recommendation criterion or multiple recommendation criteria, i.e., one or more game selection factors. The recommendation criterion or criteria my be limited to the information collected at block 702 or may include one or more additional or alternate criteria. Examples of such one or more additional or alternate criteria may include, but should not be limited to, game playing history of the user and/or identified player(s), i.e., one or more electronic board games played most often by the user and the identified player(s), electronic board games similar to one or more electronic board games played most often by the user and/or identified player(s), etc., time of day, geographic location of the user, age or other personal information about the user, geographic location and/or personal information about one or more identified players or potential players, local, regional and/or global popularity of board games in the user's collection, or the like.

Following block 706, the process 700 advances to block 708 where the processor 120 controls the display 132 to display a list of the recommended games, i.e., those chosen at block 706. Thereafter at block 710, the processor 120 prompts the user to select a game from the displayed list or to select to recommend other games from the user's collection of electronic board games. If the former, the process 700 advances to block 712 where the processor 120 executes the selected game. If the latter, the process 700 advances to block 714 where the processor 120 modifies one or more of the game selection factors used at block 706. Such modification of one or more of the game selection factors may be limited to information collected at the block 702, or may include additional or alternate criteria. Examples of such one or more additional or alternate criteria may include, but should not be limited to, game playing history of the user and/or identified player(s), i.e., one or more electronic board games played most often by the user and the identified player(s), electronic board games similar to one or more electronic board games played most often by the user and/or identified player(s), electronic board games having similar complexity and/or challenge to one or more electronic board games in the user's collection and/or to one or more electronic board games played most often by the identified player(s), time of day, geographic location of the user, age or other personal information about the user, geographic location and/or personal information about one or more identified players or potential players, local, regional and/or global popularity of board games in the user's collection, or the like. The process 700 loops from the block 714 to the block 706.

If, at block 704, the processor 120 determines that the user has elected to obtain a recommendation for a new electronic board game to play, i.e., one that is not currently in the user's collection of electronic board games, the process 700 advances to block 716 where the processor 120 is operable to select one or more new electronic board games (i.e., not in the user's collection of one or more electronic board games) to play based on one recommendation criterion or multiple recommendation criteria, e.g., on one or more new game selection factors. The recommendation criterion or criteria at the block 716 may be limited to the information collected at block 706 or may include one or more additional or alternate criteria. Examples of such one or more additional or alternate criteria may include, but should not be limited to, electronic board games similar to one or more electronic board games played most often by the user and/or identified player(s), electronic board games which have similar complexity and/or challenge to one or more electronic board games in the user's collection and/or to one or more electronic board games played most often by the identified player(s), time of day, geographic location of the user, age or other personal information about the user, geographic location and/or personal information about one or more identified players or potential players, local, regional and/or global popularity of electronic and/or hardware board games not in the user's collection of electronic board games, or the like. In any case, the process 700 advances from block 716 to block 718 where the processor 120 controls the display 132 of the user computing device 104, 106 to display a list of one or more recommended electronic board games selected at block 716. Thereafter at block 720, the processor 120 prompts the user to select a game from the list displayed at block 718. When the user selects a game from this list, the process 700 advances to block 722 where the processor 120 directs the user to the game download manager 338 or to another suitable website where the user may acquire the recommended electronic board game. The process 700 terminates after either of blocks 712 or 722.

Figure 13:
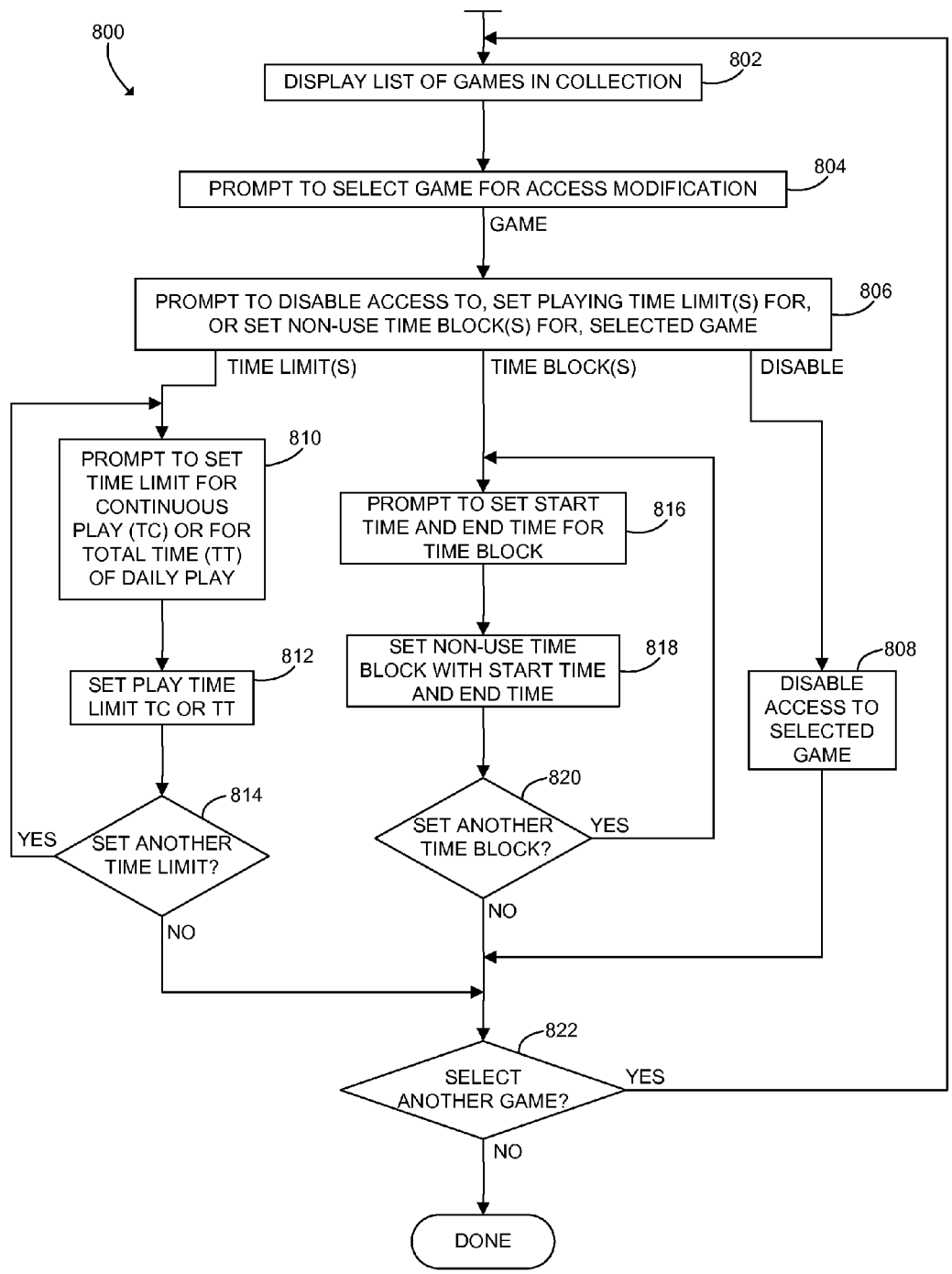
FIG. 13 is a simplified flow diagram of at least one embodiment of a process for setting one or more access limits to one or more electronic board games in the user's collection of electronic board games, which may be executed by one or more of the user computing devices and/or the game server of FIG. 1.

Referring now to FIG. 13, a simplified flow diagram is shown of at least one embodiment of a process 800 which is made available by the game policy service 334 to electronic board game users for setting one or more access limits to one or more electronic board games in the user's collection of electronic board games. The process 800 may be executed by the processor 140 of the game server 102 and/or by the processor 120 of a user computing device 104, 106. For purposes of facilitating an understanding of FIG. 13, the process 800 will be described as being executed by the processor 120 of a user computing device 104, 106. The process 800 may illustratively be provided to users as a selectable option within the game management program and/or as a separate service which users may join separately from the game management program. In any case, the process 800 begins at block 802 where the processor 120 controls the display 132 of the user computing device 104, 106 to display a list of electronic board games in the user's collection of electronic board games. Thereafter at block 804, the processor 120 prompts the user, e.g., via control of the display 132, to select a game from the displayed list for access modification. Thereafter at block 806, the processor 120 prompts the user, e.g., via control of the display 132, to elect to disable access to the selected electronic board game, set one or more playing time limits for the selected electronic board game or to set one or more non-use time blocks for the selected electronic board game. If the user selects to disable access to the selected electronic board game, the process 800 advances to block 808 where the processor 120 disables access to the selected game. Subsequent attempts to activate (i.e., execute) the selected electronic board game will be denied, and may be accompanied by display of a suitable informative message describing a reason for denying access to the selected electronic board game. The process 800 advances from block 808 to block 822.

If, at block 806, the processor 120 determines that user has elected to set one or more playing time limits for the selected electronic board game, the process 800 advances to block 810 where the processor 120 prompts the user, e.g., via control of the display 132, to set a continuous play time limit to limit continuous play of the selected electronic board game for a specified time duration, or to set a total playing time limit to limit the total time of play of the selected electronic board game during any one day or other time period. The process 800 advances from block 810 to block 812 where the processor 120 sets the play time limit based on information provided by the user in response to the prompt at block 810, and thereafter at block 814 the processor 120 prompts the user to set another time limit. If the user so elects, the process 800 loops back to block 810, and otherwise the process 800 advances to block 822. Subsequent attempts to activate (i.e., execute) the selected electronic board game after the selected board game has been played continuously for at least set allowable continuous play time period and/or has been played for at least the set allowable total play time limit during one day (or other defined time period), will be denied, and may be accompanied by display of a suitable informative message describing a reason for denying access to the selected electronic board game.

If, at block 806, the user elects to set one or more non-use time blocks for the selected electronic board game, the process 800 advances to block 816 where the processor 120 prompts, e.g., via control of the display 132, to set a start time and an end time to designate a time block of non-use of the selected electronic board game. Thereafter at block 818, the processor 120 sets the non-use time block with the start and end times selected by the user in response to the prompt at block 816, and thereafter at block 820 the processor 120 prompts the user to set another time block. If the user so elects, the process 800 loops back to block 816, and otherwise the process 800 advances to block 822. Subsequent attempts to activate (i.e., execute) the selected electronic board game during any of the non-use time blocks set at block 818 will be denied, and may be accompanied by display of a suitable informative message describing a reason for denying access to the selected electronic board game.

At block 822, the processor 120 prompts the user to select another electronic board game in the user's collection of electronic board games in which to limit playing access. If the user so elects, the process 800 loops back to block 822, and otherwise the process 800 terminates.

It will be appreciated that the process 800 may alternatively or additionally include conventional blocks to limit, grant and/or deny access to one or more electronic board games in the user's collection of electronic board games based on the identity of the person attempting to access an electronic board game from the user's collection. For example, the process 800 may be modified to include conventional blocks for limiting, granting and/or denying access to one or more electronic board games in the user's collection of electronic board games based on one or more specific player passwords or other game access codes, based on any and all passwords or other access codes other than that of the user, or the like. Modifications to the process 800 to include such conventional blocks would be a mechanical block for skilled programmer.

Figure 14:
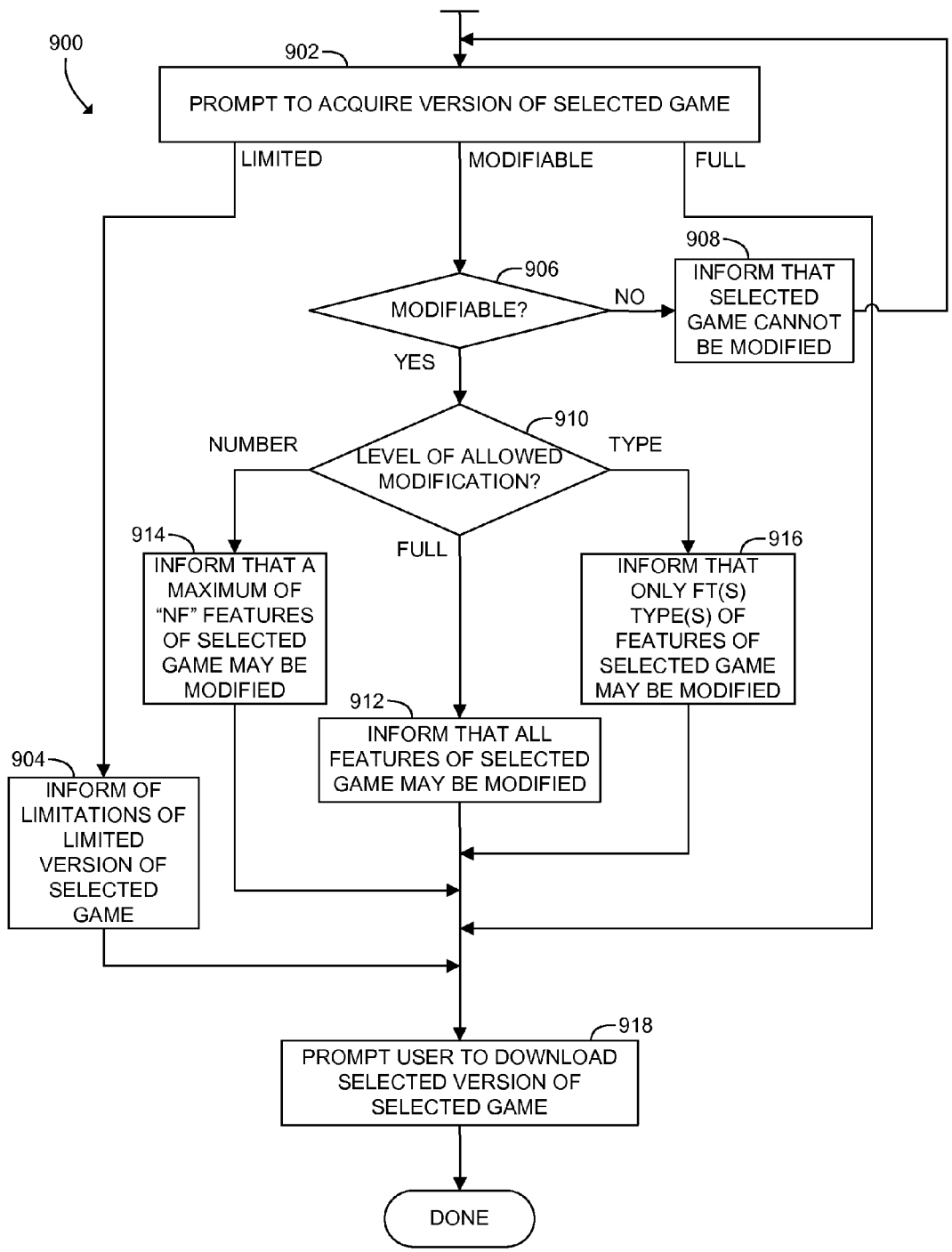
FIG. 14 is a simplified flow diagram of at least one embodiment of a process for acquiring a game via the game server, which may be executed by one or more of the user computing devices and/or the game server of FIG. 1.

Referring now to FIG. 14, a simplified flow diagram is shown of at least one embodiment of a process 900 which is made available by the game download manager 338 to electronic board game users for acquiring one or more electronic board games. The process 900 may be executed by the processor 140 of the game server 102 and/or by the processor 120 of a user computing device 104, 106. For purposes of facilitating an understanding of FIG. 14, the process 900 will be described as being executed by the processor 120 of a user computing device 104, 106. The process 900 assumes that the user has selected an electronic board game to acquire, and the process 900 operates to guide the user through one of several electronic board game acquisition options. In any case, the process 900 begins at block 902 where the processor 120 prompts the user, e.g., via control of the display 132, to select to acquire the desired version (e.g., full version, limited version, or modifiable version) of the selected electronic board game. If the user elects to acquire the limited version, the process 900 advances to block 904 where the processor 120 informs, e.g., via control of the display 132, of the various limitations of the limited version of the selected electronic board game. Examples of the various limitations which may be included with the limited version are described hereinabove with respect to the game download manager block 388 illustrated in FIG. 7, and will not be repeated here for brevity.

If, at block 902, the user elects to acquire the modifiable version of the selected electronic board game, the process 900 advances to block 906 in which the processor 120 determines whether the selected electronic board game is modifiable. If the game modification indicator signifies that all modifications to the game have been disabled, block 906 directs the processor 120 to block 908 where the processor 120 informs, e.g., via control of the display 132, that the selected game cannot be modified. If, however, the game modification indicator signifies that the selected electronic board game is modifiable, the processor 120 determines the level of modification in block 910.

If the game modification indicator signifies that all features of the selected game can be modified, block 910 directs the processor 120 to block 912 in which the processor 120 informs, e.g., via the display 132, that all features of the selected game may be modified. If game modification indicator signifies that only a maximum number of features of the selected game may be modified, block 910 directs the processor 120 to block 914 in which the processor 120 informs, e.g., via control of the display 132, of the maximum number of modifiable features designated by the game developer according to the process 500 illustrated in FIG. 9. Finally, if game modification indicator signifies that only one or more types of features of the selected electronic board game may be modified, block 910 directs the processor 120 to block 916 in which the processor 120 informs, e.g., via control of the display 132, of the one or more types of modifiable features designated by the game developer according to the process 500 illustrated in FIG. 9. Following each of blocks 904, 912, 914, 916 and if the user elects to acquire the full version of the selected electronic board game at block 902, the process 900 advances to block 918 where the processor 120 prompts the user, e.g., via control of the display 132, to download the selected version of the selected electronic board game. Thereafter the process 900 terminates.

Figure 15:
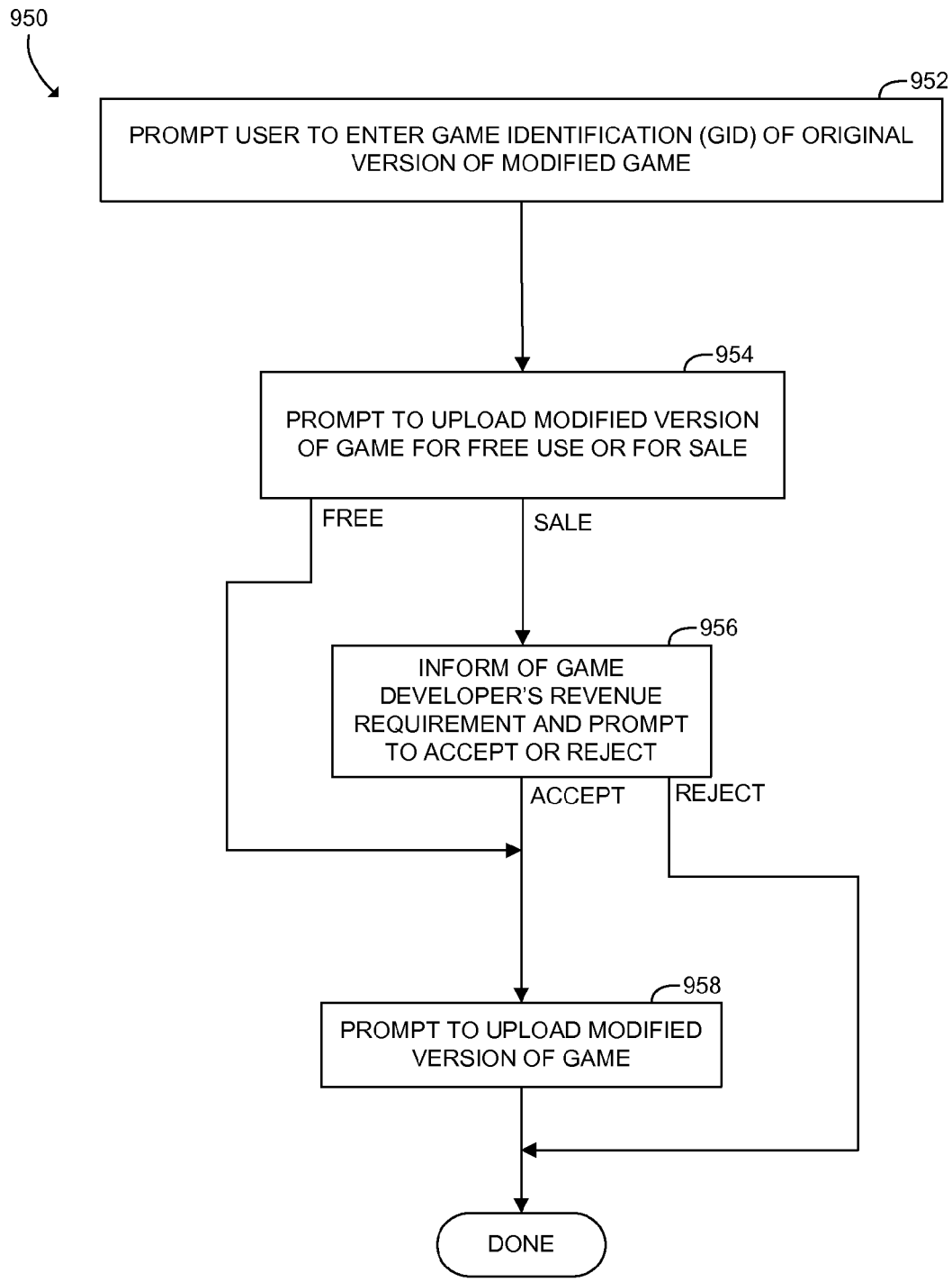
FIG. 15 is a simplified flow diagram of at least one embodiment of a process for uploading a version of a game that has been modified by a user for use by others, which may be executed by one or more of the user computing devices and/or the game server of FIG. 1.

Referring now to FIG. 15, a simplified flow diagram is shown of at least one embodiment of a process 950 which is made available by the modified game upload manager 340 to electronic board game users for uploading modified versions of one or more electronic board games. The process 950 may be executed by the processor 140 of the game server 102 and/or by the processor 120 of a user computing device 104, 106. For purposes of facilitating an understanding of FIG. 15, the process 950 will be described as being executed by the processor 120 of a user computing device 104, 106. The process 950 assumes that the user has acquired an original, modifiable version of an electronic board game, e.g., via the game download manager 338, and has modified the original, modifiable version in accordance with any modification limits imposed by the game developer, to produce a modified version of the electronic board game that the user wishes to upload to the game server 102 to thereby make the modified version of the electronic board game available to others. The process 950 begins at block 952 where the processor 120 prompts the user, e.g., via the display screen of the user computing device 104, 106, to enter a game identification (GID) of the original version of the modified version of the electronic board game. Illustratively, the game identification, GID, is an alphanumeric or other code which uniquely identifies the original version of the electronic board game acquired by, and then modified by, the user. The game identification may, for example, be provided to the user at the time the user acquires the modifiable version of the electronic board game. In any case, the process 950 advances from block 952 to block 954 where the processor 120 prompts the user to elect to upload the modified version of the electronic board game for free use by others or for sale to others. If the former, the process 950 advances to block 958 where the processor 120 prompts the user, e.g., via control of the display 132, to upload the modified version of the electronic board game for free use by others. If the latter, the process 950 advances to block 956 where the processor 120 informs, e.g., via control of the display 132, of the game developer's revenue requirement and prompts the user to accept or reject such requirement. For example, the game developer may require a Z % share of revenues from sales of all modified versions of the electronic board game, where the value of Z may be arbitrary and will generally be dictated by the game developer. In some embodiments, the game developer may choose to select the value Z base, at least in part, on the degree and/or type of modifications allowed by the game developer to the electronic board game. In any case, if the user elects at bock 956 to accept the game developer's revenue requirement, the process 900 advances to block 958 where the processor 120 prompts, e.g., via control of the display 132, to upload the modified version of the game. If the user elects to reject the game developer's revenue requirement, and after execution of the block 958, the process 900 terminates.

EXAMPLES

Illustrative examples of the devices, systems, and methods disclosed herein are provided below. An embodiment of the devices, systems, and methods may include any one or more, and any combination of, the examples described below.

Example 1 includes a server to host an electronic board game service via a network, the server comprising a game development module to provide one or more electronic board templates and a plurality of electronic board game piece templates to develop one or more electronic board games, a game acquisition module to provide for acquisition of the one or more electronic board games by users of the electronic board game service, and a game services module to provide to users of the electronic board game service at least one service relating to the one or more electronic board games.

Example 2 includes the subject matter of Example 1, and wherein the plurality of electronic board game piece templates comprise any one or combination of one or more card templates, one or more die or dice templates, one or more game currency templates, one or more paper piece templates and one or more plastic and/or metal game piece templates.

Example 3 includes the subject matter of any of Examples 1 and 2, and wherein at least one of the one or more electronic board games includes a plurality of unique hardware game pieces, and wherein the game development module further comprises a hardware game piece identification sub-module to associate the plurality of unique hardware game pieces with one or more corresponding players of the at least one of the one or more electronic board games.

Example 4 includes the subject matter of any of Examples 1-3, and wherein the plurality of unique hardware game pieces each define a unique footprint, and wherein the hardware game piece identification sub-module is configured to associate the plurality of unique hardware game pieces with the one or more corresponding plurality of players by assigning a different one of the unique footprints to each of the corresponding plurality of players.

Example 5 includes the subject matter of any of Examples 1-4, and wherein the plurality of unique hardware game pieces each comprise a communication device configured to produce a unique identification signal, and wherein the hardware identification sub-module to associate the plurality of unique hardware game pieces with the one or more corresponding plurality of players by assigning a different one of the unique identification signals to each of the corresponding plurality of players.

Example 6 includes the subject matter of any of Examples 1-5, and wherein the game development module comprises a game modification rules sub-module to define one or more rules for limiting modification of at least one of the one or more electronic board games.

Example 7 includes the subject matter of any of Examples 1-6, and wherein the at least one of the one or more electronic board games comprises one of a plurality of different game features and a plurality of different types of game features, and wherein the game modification rules sub-module to define one of at least one rule to limit a total number of features of the at least one of the one or more electronic board games that may be modified to a subset of the plurality of different game features, at least one rule to limit the types of features of the at least one of the one or more electronic board games which may be modified to a subset of the plurality of different types of game features, and at least one rule to disable any modification of the at least one of the one or more electronic board games.

Example 8 includes the subject matter of any of Examples 1-7, and wherein the game acquisition module comprises a game download manager to manage downloading of the one or more electronic board games by the users of the electronic board game service.

Example 9 includes the subject matter of any of Examples 1-8, and wherein the game download manager to make available for downloading by the users of the electronic board game service at least one of a limited version and a modifiable version of the at least one of the one or more electronic board games.

Example 10 includes the subject matter of any of Examples 1-9, and wherein the game download manager to make available for download by the users of the electronic board game service the limited version of the one or more electronic board games for only a predefined duration after which the limited version of the one or more electronic board game is disabled.

Example 11 includes the subject matter of any of Examples 1-10, and wherein the at least one of the one or more electronic board games comprises at least one of a plurality of different game features and a plurality of different types of game features, and wherein the game download manager to limit modifications allowed to be made to the modifiable version of the at least one of the one or more electronic board games by one of limiting a total number of features of the modifiable version of the at least one of the one or more electronic board games that may be modified to a subset of the plurality of different game features, and limiting the types of features of the modifiable version of the at least one of the one or more electronic board games that may be modified to a subset of the plurality of different types of game features.

Example 12 includes the subject matter of any of Examples 1-11, and wherein the game acquisition module comprises a modified game upload manager to manage uploading of the modifiable version of the at least one of the one or more electronic board games to the server after the modifiable version is modified for one of free use by others and sale to others.

Example 13 includes the subject matter of any of Examples 1-12, and wherein the modified game upload manager to manage uploading of the modified version of the modifiable version of the at least one of the one or more electronic board games for sale to others only upon acceptance by an uploader of the modified version of a revenue sharing amount between the uploader and a developer of the modifiable version which revenue sharing amount defines an amount of revenue resulting from sales of the modified version to others owed by the uploader to the developer.

Example 14 includes the subject matter of any of Examples 1-13, and wherein the game services module comprises at least one of (a) a game piece applications library to store virtual game piece applications for downloading by users of the electronic board game service, (b) a private game component sub-module to store one or more software applications associated with at least one of the one or more electronic board games for hiding certain information related to play by one player of the at least one of the one or more electronic board games from one or more other players of the at least one of the one or more electronic board games, (c) a remote player game service to provide for playing of at least one of the one or more electronic board games by a plurality of users, at least one of which is physically located remotely from others of the plurality of users, (d) a game recommendation service to recommend to users one or more electronic board games to play from at least one of the users' collection of electronic board games and a list of electronic board games in which none are part of the users' collection of electronic board games, based on at least one recommendation criterion, and (e) a game policy service to limit access to at least one electronic board game in a user's collection of electronic board games.

Example 15 includes the subject matter of any of Examples 1-14, and wherein the remote player game service to provide for playing of the at least one of the one or more electronic board games at least one of synchronously and asynchronously between the plurality of users.

Example 16 includes the subject matter of any of Examples 1-15, and wherein the game policy server to at least one of (a) restrict access to the at least one electronic board game by at least one user, (b) limit continuous play of the at least one electronic board game to a maximum time period, and (c) limit total time of play of the at least one electronic board game within a predefined time period to a maximum time amount.

Example 17 includes a method of hosting an electronic board game service via a network, the method comprising providing one or more electronic board templates and a plurality of electronic board game piece templates for development of one or more electronic board games, providing for acquisition of the one or more electronic board games by users of the electronic board game service, and providing to users of the electronic board game service at least one service relating to the one or more electronic board games.

Example 18 includes the subject matter of Example 17, and wherein at least one of the one or more electronic board games includes a plurality of unique hardware game pieces, and wherein the method further comprises associating the plurality of unique hardware game pieces with one or more corresponding players of the at least one of the one or more electronic board games.

Example 19 includes the subject matter of any of Examples 17 and 18, and wherein the plurality of unique hardware game pieces each define a unique footprint, and wherein associating the plurality of unique hardware game pieces comprises associating the plurality of unique hardware game pieces with the one or more corresponding plurality of players by assigning a different one of the unique footprints to each of the corresponding plurality of players.

Example 20 includes the subject matter of any of Examples 17-19, and wherein the plurality of unique hardware game pieces each comprise a communication device configured to produce a unique identification signal, and wherein associating the plurality of unique hardware game pieces comprises associating the plurality of unique hardware game pieces with the one or more corresponding plurality of players by assigning a different one of the unique identification signals to each of the corresponding plurality of players.

Example 21 includes the subject matter of any of Examples 17-20, and further including providing for selection in the development of the one or more electronic board games one or more rules for limiting modification of at least one of the one or more electronic board games, wherein the at least of the one or more electronic board games comprises at least one of a plurality of different game features and a plurality of different types of game features, and wherein the one or more rules for limiting modification of at least one of the one or more electronic board games includes (a) at least one rule to limit a total number of features of the at least one of the one or more electronic board games that may be modified to a subset of the plurality of different game features, and/or (b) at least one rule to limit the types of features of the at least one of the one or more electronic board games which may be modified to a subset of the plurality of different types of game features, and/or (c) at least one rule to disable any modification of the at least one of the one or more electronic board games.

Example 22 includes the subject matter of any of Examples 17-21, and wherein providing for acquisition of the one or more electronic board games comprises providing for downloading by the users of the electronic board game service at least one of a full version, a limited version and a modifiable version of at least one of the one or more electronic board games.

Example 23 includes the subject matter of any of Examples 17-22, and further including providing for uploading of the modifiable version of the at least one of the one or more electronic board games to a server of the electronic game service after the modifiable version is modified for one of free use by others and for sale to others.

Example 24 includes the subject matter of any of Examples 17-23, and wherein providing for uploading of the modified version of the at least one of the one or more electronic board games for sale to others comprises providing for uploading of the modified version only upon acceptance by an uploader of the modified version of a revenue sharing amount between the uploader and a developer of the modified version which revenue sharing amount defines an amount of revenue resulting from sales of the modified version to others owed by the uploader to the developer.

Example 25 includes the subject matter of any of Examples 17-24, and wherein providing to the users at least one service relating to the one or more electronic board games comprises at least one of (a) providing for downloading by the users one or more virtual game piece applications, (b) providing for downloading by the users one or more software applications associated with at least one of the one or more electronic board games for hiding certain information related to play by one player of the at least one of the one or more electronic board games from one or more other players of the at least one of the one or more electronic board games, (c) providing for playing of at least one of the one or more electronic board games by a plurality of users, at least one of which is physically located remotely from others of the plurality of users, (d) providing to users at least one recommendation of one or more electronic board games to play from at least one of the users' collection of electronic board games and a list of electronic board games in which none are part of the users' collection, based on at least one recommendation criterion, and (e) providing for limiting of access to at least one electronic board game in a user's collection of electronic board games by at least one of (i) limiting of continuous play of the at least one electronic board game to a maximum time period, (ii) limiting a total time of play of the at least one electronic board game within a predefined time period to a maximum time amount and (iii) restricting of access to the at least one electronic board game by at least one user.

Example 26 includes the subject matter of any of Examples 17-25, and wherein providing for playing of at least one of the one or more electronic board games by a plurality of users, at least one of which is physically located remotely from others of the plurality of users, comprises providing for playing of the at least one of the one or more electronic board games at least one of synchronously between the plurality of users and asynchronously between the plurality of players.

Example 27 includes one or more computer readable media containing instructions for hosting an electronic board game service via a network, wherein execution of the instructions by one or more processors of a computing device causes the one or more processors to provide one or more electronic board templates and a plurality of electronic board game piece templates for development of one or more electronic board games, provide for acquisition of the one or more electronic board games by users of the electronic board game service, and provide to users of the electronic board game service at least one service relating to the one or more electronic board games.

Example 28 includes the subject matter of Example 27, and wherein at least one of the one or more electronic board games includes a plurality of unique hardware game pieces, and wherein execution of the instructions further causes the one or more processors to associate the plurality of unique hardware game pieces with one or more corresponding players of the at least one of the one or more electronic board games.

Example 29 includes the subject matter of any of Examples 27 and 28, and wherein the plurality of unique hardware game pieces each define a unique footprint, and wherein execution of the instructions further causes the one or more processors to associate the plurality of unique hardware game pieces with the one or more corresponding plurality of players by assigning a different one of the unique footprints to each of the corresponding plurality of players.

Example 30 includes the subject matter of any of Examples 27-29, and wherein the plurality of unique hardware game pieces each comprise a communication device configured to produce a unique identification signal, and wherein execution of the instructions further causes the one or more processors to associate the plurality of unique hardware game pieces with the one or more corresponding plurality of players by assigning a different one of the unique identification signals to each of the corresponding plurality of players.

Example 31 includes the subject matter of any of Examples 27-30, and wherein execution of the instructions further causes the one or more processors to provide for selection in the development of the one or more electronic board games one or more rules for limiting modification of at least one of the one or more electronic board games, and wherein the at least one of the one or more electronic board games comprises at least one of a plurality of different game features and a plurality of different types of game features, and wherein execution of the instructions further causes the one or more processors to include in the one or more rules (a) at least one rule to limit a total number of features of the at least one of the one or more electronic board games that may be modified to a subset of the plurality of different game features, and/or (b) at least one rule to limit the types of features of the at least one of the one or more electronic board games which may be modified to a subset of the plurality of different types of game features, and/or (c) at least one rule to disable any modification of the at least one of the one or more electronic board games.

Example 32 includes the subject matter of any of Examples 27-31, and wherein execution of the instructions further causes the one or more processors to provide for downloading by the users of the electronic board game service at least one of a full version, a limited version and a modifiable version of at least one of the one or more electronic board games.

Example 33 includes the subject matter of any of Examples 27-32, and wherein execution of the instructions further causes the one or more processors to provide for uploading of the modifiable version of the at least one of the one or more electronic board games to a server of the electronic game service after the modifiable version is modified for one of free use by others and sale to others.

Example 34 includes the subject matter of any of Examples 27-33, and wherein execution of the instructions further causes the one or more processors to provide for uploading of the modified version for sale to others only upon acceptance by an uploader of the modified version of a revenue sharing amount between the uploader and a developer of the modified version which revenue sharing amount defines an amount of revenue resulting from sales of the modified version to others owed by the uploader to the developer.

Example 35 includes the subject matter of any of Examples 27-34, and wherein execution of the instructions further causes the one or more processors to provide to users of the electronic board game service the at least one service relating to the one or more electronic board games by (a) providing for downloading by the users one or more virtual game piece applications, (b) providing for downloading by the users one or more software applications associated with at least one of the one or more electronic board games for hiding certain information related to play by one player of the at least one of the one or more electronic board games from one or more other players of the at least one of the one or more electronic board games, (c) providing for playing of at least one of the one or more electronic board games by a plurality of users, at least one of which is physically located remotely from others of the plurality of users, (d) providing to users at least one recommendation of one or more electronic board games to play from at least one of the users' collection of electronic board games and a list of electronic board games in which none are part of the users' collection of electronic board games, based on at least one recommendation criterion, and (e) providing for limiting of access to at least one electronic board game in a user's collection of electronic board games by at least one of (i) providing for limiting of continuous play of the at least one electronic board game to a maximum time period, (ii) providing for limiting a total time of play of the at least one electronic board game within a predefined time period to a maximum time amount and (iii) providing for restricting of access to the at least one electronic board game by at least one user.

Example 36 includes the subject matter of any of Examples 27-35, and wherein execution of the instructions further causes the one or more processors to provide for playing of the at least one of the one or more electronic board games by a plurality of users, at least one of which is physically located remotely from others of the plurality of users, by providing for remote playing of the at least one of the one or more electronic board games at least one of synchronously and asynchronously between the plurality of users.

Example 37 includes a user computing device to execute electronic board games, the user computing device comprising a display screen orientable upwardly to support thereon at least one hardware game piece associated with at least one electronic board game, a memory to store the at least one electronic board game, and a processor to execute the electronic board game and to control the display screen to display an electronic version of a board surface of the electronic board game.

Example 38 includes the subject matter of Example 37, and wherein the display screen comprises a touch screen, the at least one hardware game piece comprising a plurality of different hardware game pieces each defining a unique footprint, and the processor to associate each of the plurality of different hardware game pieces with a different one of a corresponding plurality of players of the at least one electronic board game by sensing via the touch screen the unique footprint of each of the plurality of hardware game pieces and assigning each sensed, unique footprint to a different one of the plurality of players.

Example 39 includes the subject matter of any of Examples 37 and 38, and wherein the processor to track a position of each of the plurality of players relative to the electronic version of the board surface of the electronic board game by sensing via the touch screen the unique footprints of each of the plurality of hardware game pieces and associating each of the sensed, unique footprints with the one of the plurality of players assigned thereto.

Example 40 includes the subject matter of any of Examples 37-39, and wherein the at least one hardware game piece comprises a plurality of different hardware game pieces each comprising a different communication device to produce a unique identification signal, and the processor to associate each of the plurality of different hardware game pieces with a different one of a corresponding plurality of players of the at least one electronic board game by sensing the unique identification signal produced by each of the different communication devices and assigning each sensed, unique identification signal to a different one of the plurality of players.

Example 41 includes a method of managing and executing acquired electronic board games with a computing device having a memory, a processor and a display screen, the method comprising storing at least one acquired electronic board game in the memory, executing the electronic board game with the processor, controlling the display screen with the processor during execution of the electronic board game to display thereon an electronic version of a board surface of the electronic board game, and orienting the display screen upwardly to support thereon at least one hardware game piece associated with the at least one electronic board game.

Example 42 includes the subject matter of Example 41, and wherein the display screen comprises a touch screen, and the at least one hardware game piece comprises a plurality of different hardware game pieces each defining a unique footprint, and wherein the method further comprises associating each of the plurality of different hardware game pieces with a different one of a corresponding plurality of players of the at least one electronic board game by sensing via the touch screen the unique footprint of each of the plurality of hardware game pieces and assigning each sensed, unique footprint to a different one of the plurality of players.

Example 43 includes the subject matter of any of Examples 41 and 42, and wherein the method further comprises tracking a position of each of the plurality of players relative to the electronic version of the board surface of the electronic board game by sensing via the touch screen the unique footprints of each of the plurality of hardware game pieces and associating each of the sensed, unique footprints with the one of the plurality of players assigned thereto.

Example 44 includes the subject matter of any of Examples 41-43, and wherein the at least one hardware game piece comprises a plurality of different hardware game pieces each comprising a different communication device to produce a unique identification signal, and wherein the method further comprises associating each of the plurality of different hardware game pieces with a different one of a corresponding plurality of players of the at least one electronic board game by sensing the unique identification signal produced by each of the different communication devices and assigning each sensed, unique identification signal to a different one of the plurality of players.

Example 45 includes one or more computer readable media containing instructions for managing and executing acquired electronic board games, wherein execution of the instructions by one or more processors of a computing device having a display screen causes the one or more processors to store at least one acquired electronic board game in a memory, execute the electronic board game, and control the display screen during execution of the electronic board game to display thereon an electronic version of a board surface of the electronic board game, wherein orienting the display screen upwardly provides a support surface for supporting at least one hardware game piece associated with the at least one electronic board game.

Example 46 includes the subject matter of Example 45, and wherein the display screen comprises a touch screen, and the at least one hardware game piece comprises a plurality of different hardware game pieces each defining a unique footprint, and wherein execution of the instructions causes the one or more processors to associate each of the plurality of different hardware game pieces with a different one of a corresponding plurality of players of the at least one electronic board game by sensing via the touch screen the unique footprint of each of the plurality of hardware game pieces and assigning each sensed, unique footprint to a different one of the plurality of players.

Example 47 includes the subject matter of any of Examples 45 and 46, and wherein execution of the instructions causes the one or more processors to track a position of each of the plurality of players relative to the electronic version of the board surface of the electronic board game by sensing via the touch screen the unique footprints of each of the plurality of hardware game pieces and associating each of the sensed, unique footprints with the one of the plurality of players assigned thereto.

Example 48 includes the subject matter of any of Examples 45-47, and wherein the at least one hardware game piece comprises a plurality of different hardware game pieces each comprising a different communication device to produce a unique identification signal, and wherein execution of the instructions causes the one or more processors to associate each of the plurality of different hardware game pieces with a different one of a corresponding plurality of players of the at least one electronic board game by sensing the unique identification signal produced by each of the different communication devices and assigning each sensed, unique identification signal to a different one of the plurality of players.

Example 49 includes a user computing device to design an electronic board game, the user computing device comprising a communication circuit to conduct electronic communications via a network, a memory to store an electronic board game, and a processor to control the communication circuit to receive via the network at least one game board template and a plurality of game piece templates to use to design the electronic board game, and to store the designed electronic board game in the memory.

Example 50 includes the subject matter of Example 49, and wherein the electronic board game comprises at least one of a plurality of different game features and a plurality of different types of game features, the processor to permit subsequent modification of at least one of (a) all of the different game features, (b) only a specified number of the plurality of different game features less that is than the plurality of different game features, and (c) only a specified subset of the plurality of different types of game features.

Example 51 includes a method of designing an electronic board game with a user computing device having a processor, a memory and configured to communicate via a network, the method comprising receiving via the network at least one game board template and a plurality of game piece templates, using the at least one game board template and at least one of the plurality of game piece templates to design the electronic board game, and storing the designed electronic board game in the memory.

Example 52 includes the subject matter of Example 51, and wherein the designed electronic board game comprises at least one of a plurality of different game features and a plurality of different types of game features, the method further comprising permitting subsequent modification of at least one of (a) all of the different game features, (b) only a specified number of the plurality of different game features that is less than the plurality of different game features, and (c) only a specified subset of the plurality of different types of game features.

Example 53 includes one or more computer readable media including instructions for designing an electronic board game with a user computing device having one or more processors, a memory and configured to communicate via a network, wherein execution of the instructions by the one or more processors of the computing device causes the one or more processors to receive via the network at least one game board template and a plurality of game piece templates, use the at least one game board template and at least one of the plurality of game piece templates to design the electronic board game, and store the designed electronic board game in the memory.

Example 54 includes the subject matter of Example 53, and wherein the designed electronic board game comprises at least one of a plurality of different game features and a plurality of different types of game features, and wherein execution of the instructions cause the one or more processors to permit subsequent modification of at least one of (a) all of the different game features, (b) only a specified number of the plurality of different game features that is less than the plurality of different game features, and (c) only a specified subset of the plurality of different types of game features.

Example 55 includes a system for playing electronic board games, the system comprising a user computing device comprising a memory to store an electronic board game, a processor to execute the electronic board game and a display screen to display a graphical representation of the electronic board game during execution thereof, at least one hardware game piece to be used during play of the electronic board game, and an electronic device separate from the user computing device and comprising a memory to store at least one of (a) a software application to hide certain information relating to play by one player of the electronic board game from other players of the electronic board game, a processor to execute the at least one software application and a display screen to display the certain information only to the one player during play of the electronic board game and (b) a software application of a virtual representation of the at least one hardware game piece, a processor to execute the at least one software application and a display screen to display the virtual representation of the hardware game piece during execution thereof, wherein the virtual representation of the hardware game piece is usable during game play of the electronic board game in place of the at least one hardware game piece.

Example 56 includes the subject matter of Example 55, and further including a server separate from the user computing device and from the electronic device and comprising at least one of (a) a virtual game piece applications library to store a plurality of different virtual game piece applications, the processor to acquire the virtual game piece application, in the form of the at least one software application, from the virtual game piece applications library of the server, and (b) a private game component sub-module to store one or more software applications associated with electronic board games for hiding certain information related to play by one player of an electronic board game from one or more other players of that electronic board game, the processor to acquire the software application to hide certain information relating to play of the electronic board game from other players of the electronic board game from the server.

Example 57 includes the subject matter of any of Examples 55 and 56, and wherein the server comprises a first communication circuit to conduct communications via a network, and wherein the electronic device comprises a second communication circuit to conduct communications via the network, and wherein the processor to at least one of (a) acquire the virtual game piece application from the server by downloading the virtual game piece application, in the form of the at least one software application, from the virtual game piece applications library via the network, and (b) acquire the software application to hide certain information relating to play of the electronic board game from other players of the electronic board game from the server by downloading the software application from the private game component sub-module via the network.

Example 58 includes a method for playing an electronic board game with a system including an electronic device having a first processor and a first display screen and a user computing device separate from the electronic device, the user computing device having a second processor and a second display screen, the electronic board having at least one associated hardware game piece to be used during play thereof, the method comprising executing the electronic board game with the second processor, controlling the second display screen with the second processor during execution of the electronic board game to display thereon a graphical representation of the electronic board game, executing with the first processor (a) at least one software application of a virtual representation of the at least one hardware game piece, and/or (b) at least one software application to hide with the electronic device certain information relating to play by one player of the electronic board game from other players of the electronic board game, and controlling the first display screen with the first processor during execution of the at least one software application to display (a) the virtual representation of the hardware game piece, and/or (b) the certain information only to the one player during play of the electronic board game, wherein the virtual representation of the hardware game piece is usable during game play of the electronic board game in place of the at least one associated hardware game piece.

Example 59 includes the subject matter of Example 58, and wherein the system further includes a server separate from the user computing device and from the electronic device and comprising at least one of (a) a virtual game piece applications library to store a plurality of different virtual game piece applications, and (b) a private game component sub-module to store one or more software applications associated with electronic board games for hiding certain information related to play by one player of an electronic board game from one or more other players of that electronic board game, and wherein the method further comprises acquiring from the server at least one of (a) the virtual game piece application, in the form of the at least one software application, from the virtual game piece applications library, and (b) the at least one software application to hide the certain information with the electronic device, and storing in the memory of the electronic device (a) the at least one software application of the virtual game piece application and/or (b) the software application to hide the certain information with the electronic device.

Example 60 includes the subject matter of any of Examples 58 and 60, and wherein the server comprises a first communication circuit to conduct communications via a network, and wherein the electronic device comprises a second communication circuit to conduct communications via the network, and wherein the method further comprises (a) acquiring the virtual game piece application from the server by downloading the virtual game piece application, in the form of the at least one software application, from the virtual game piece applications library via the network, and/or (b) acquiring from the server the at least one software application to hide the certain information with the electronic device by downloading from the private game component sub-module via the network the software application to hide the certain information with the electronic device.

Example 61 includes one or more computer readable media including instructions for playing an electronic board game having at least one associated hardware game piece to be used during play thereof, wherein execution of the instructions by one or more processors causes the one or more processors to execute the electronic board game, control a display screen of a user computing device during execution of the electronic board game to display thereon a graphical representation of the electronic board game, execute (a) at least one software application of a virtual representation of the at least one hardware game piece and/or (b) at least one software application to hide with an electronic device, separate from the user computing device, certain information relating to play by one player of the electronic board game from other players of the electronic board game and control a display screen of an electronic device separate from the user computing device (a) during execution of the at least one software application to display thereon the virtual representation of the hardware game piece, wherein the virtual representation of the hardware game piece is usable during game play of the electronic board game in place of the at least one associated hardware game piece, and/or (b) during execution of the at least one software application to display the certain information only to the one player during play of the electronic board game.

Example 62 includes the subject matter of Example 61, and wherein execution of the instructions causes the one or more processors to (a) acquire the virtual game piece application, in the form of the at least one software application, from a virtual game piece applications library of a server that is separate from the user computing device and from the electronic device, and/or (b) to acquire from a private game component sub-module of a server that is separate from the user computing device and from the electronic device the at least one software application to display the certain information only to the one player during play of the electronic board game.

Example 63 includes the one or more computer readable media of claim 126 wherein execution of the instructions causes the one or more processors to (a) acquire the virtual game application from the server by downloading the virtual game piece application, in the form of the at least one software application, from the virtual game piece applications library via a network, and (b) acquire the at least one software application to display the certain information only to the one player during play of the electronic board game by downloading from the virtual private game component sub-module via a network the at least one software application to display the certain information only to the one player during play of the electronic board game, and to store in the memory of the electronic device (a) the at least one software application of the virtual game piece application and/or (b) the software application to display the certain information only to the one player during play of the electronic board game.

Example 64 includes a computing device comprising a processor; and a memory having stored therein a plurality of instructions that, in response to being executed by the processor, results in the processor performing the method of any of Examples 17-26, 41-44, 51-52 and 58-60.

Example 65 includes one or more machine readable media comprising a plurality of instructions stored thereon that in response to being executed result in a computing device performing any of Examples 17-26, 41-44, 51-52, and 58-60.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A server to host an electronic board game service via a network, the server comprising:
   a game development module to provide one or more electronic board templates and a plurality of electronic board game piece templates to develop one or more electronic board games, wherein (i) at least one of the one or more electronic board games includes a plurality of unique hardware game pieces, (ii) each unique hardware game piece of the plurality of unique hardware game pieces comprises a communication device configured to produce a unique identification signal, (iii) the game development module comprises a game modification rules sub-module to define one or more rules for limiting modification of at least one electronic board game of the one or more electronic board games and a hardware game piece identification sub-module to assign a different one of the unique identification signals to each player of one or more corresponding players of the one or more electronic board games, and (ii) (iv) the at least one electronic board game comprises at least one of a plurality of different game features or at least one of a plurality of different types of game features, a game acquisition module to provide for acquisition of the one or more electronic board games by users of the electronic board game service, and a game services module to provide to users of the electronic board game service at least one service relating to the one or more electronic board games, wherein the game modification rules sub-module is to define at least one of: (i) at least one rule to limit a total number of features of the at least one electronic board game that may be modified to a subset of the plurality of different game features, (ii) at least one rule to limit the types of features of the at least one electronic board game that may be modified to a subset of the plurality of different types of game features, and/or (iii) at least one rule to disable any modification of the at least one electronic board game.

2. The server of claim 1 wherein the plurality of electronic board game piece templates comprise at least of one or more card templates, one or more die or dice templates, one or more game currency templates, one or more paper piece templates and one or more plastic and/or metal game piece templates.

3. The server of claim 1 wherein the plurality of unique hardware game pieces each define a unique footprint, and wherein the hardware game piece identification sub-module is configured to associate the plurality of unique hardware game pieces with the one or more corresponding plurality of players by assigning a different one of the unique footprints to each of the corresponding plurality of players.

4. The server of claim 1 wherein the game acquisition module comprises a game download manager to manage downloading of the one or more electronic board games by the users of the electronic board game service, and wherein the game download manager to make available for downloading by the users of the electronic board game service at least one of a limited version and a modifiable version of the at least one of the one or more electronic board games.

5. The server of claim 4 wherein the game download manager to make available for download by the users of the electronic board game service the limited version of the one or more electronic board games for only a predefined duration after which the limited version of the one or more electronic board game is disabled.

6. The server of claim 4 wherein the at least one of the one or more electronic board games comprises at least one of a plurality of different game features and a plurality of different types of game features, and wherein the game download manager to limit modifications allowed to be made to the modifiable version of the at least one of the one or more electronic board games by one of limiting a total number of features of the modifiable version of the at least one of the one or more electronic board games that may be modified to a subset of the plurality of different game features, and limiting the types of features of the modifiable version of the at least one of the one or more electronic board games that may be modified to a subset of the plurality of different types of game features.

7. The server of claim 4 wherein the game acquisition module comprises a modified game upload manager to manage uploading of the modifiable version of the at least one of the one or more electronic board games to the server after the modifiable version is modified for one of free use by others and sale to others, and wherein the modified game upload manager to manage uploading of the modified version of the modifiable version of the at least one of the one or more electronic board games for sale to others only upon acceptance by an uploader of the modified version of a revenue sharing amount between the uploader and a developer of the modifiable version which revenue sharing amount defines an amount of revenue resulting from sales of the modified version to others owed by the uploader to the developer.

8. The server of claim 1 wherein the game services module comprises at least one of (a) a game piece applications library to store virtual game piece applications for downloading by users of the electronic board game service, (b) a private game component sub-module to store one or more software applications associated with at least one of the one or more electronic board games for hiding certain information related to play by one player of the at least one of the one or more electronic board games from one or more other players of the at least one of the one or more electronic board games, (c) a remote player game service to provide for playing of at least one of the one or more electronic board games by a plurality of users, at least one of which is physically located remotely from others of the plurality of users, (d) a game recommendation service to recommend to users one or more electronic board games to play from at least one of the users' collection of electronic board games and a list of electronic board games in which none are part of the users' collection of electronic board games, based on at least one recommendation criterion, and (e) a game policy service to limit access to at least one electronic board game in a user's collection of electronic board games.

9. The server of claim 8 wherein the remote player game service to provide for playing of the at least one of the one or more electronic board games at least one of synchronously and asynchronously between the plurality of users.

10. The server of claim 8 wherein the game policy server to at least one of (a) restrict access to the at least one electronic board game by at least one user, (b) limit continuous play of the at least one electronic board game to a maximum time period, and (c) limit total time of play of the at least one electronic board game within a predefined time period to a maximum time amount.

11. One or more computer readable media containing instructions for hosting an electronic board game service via a network, wherein execution of the instructions by one or more processors of a computing device causes the one or more processors to:

provide one or more electronic board templates and a plurality of electronic board game piece templates for development of one or more electronic board games, wherein at least one of the one or more electronic board games includes a plurality of unique hardware game pieces, and wherein each unique hardware game piece of the plurality of unique hardware game pieces comprises a communication device configured to produce a unique identification signal, assign a different one of the unique identification signals to each player of one or more corresponding players of the one or more electronic board games, provide for acquisition of the one or more electronic board games by users of the electronic board game service, provide to users of the electronic board game service at least one service relating to the one or more electronic board games, and provide for selection in the development of the one or more electronic board games one or more rules for limiting modification of at least one electronic board game of the one or more electronic board games, wherein the at least one electronic board game comprises at least one of a plurality of different game features or at least one of a plurality of different types of game features,
wherein the one or more rules includes: (i) at least one rule to limit a total number of features of the at least one electronic board game that may be modified to a subset of the plurality of different game features, and/or (b) at least one rule to limit the types of features of the at least one of the one or more electronic board games which may be modified to a subset of the plurality of different types of game features, and/or (c) at least one rule to disable any modification of the at least one of the one or more electronic board games.

12. The one or more computer readable media of claim 11 wherein the plurality of unique hardware game pieces each define a unique footprint, and wherein execution of the instructions further causes the one or more processors to associate the plurality of unique hardware game pieces with the one or more corresponding plurality of players by assigning a different one of the unique footprints to each of the corresponding plurality of players.

13. The one or more computer readable media of claim 11 wherein execution of the instructions further causes the one or more processors to provide for downloading by the users of the electronic board game service at least one of a full version, a limited version and a modifiable version of at least one of the one or more electronic board games,
and wherein execution of the instructions further causes the one or more processors to provide for uploading of the modifiable version of the at least one of the one or more electronic board games to a server of the electronic game service after the modifiable version is modified for one of free use by others and sale to others.

14. The one or more computer readable media of claim 13 wherein execution of the instructions further causes the one or more processors to provide for uploading of the modified version for sale to others only upon acceptance by an uploader of the modified version of a revenue sharing amount between the uploader and a developer of the modified version which revenue sharing amount defines an amount of revenue resulting from sales of the modified version to others owed by the uploader to the developer.

15. The one or more non-transitory computer readable media of claim 11 wherein execution of the instructions further causes the one or more processors to provide to users of the electronic board game service the at least one service relating to the one or more electronic board games by (a) providing for downloading by the users one or more virtual game piece applications, (b) providing for downloading by the users one or more software applications associated with at least one of the one or more electronic board games for hiding certain information related to play by one player of the at least one of the one or more electronic board games from one or more other players of the at least one of the one or more electronic board games, (c) providing for playing of at least one of the one or more electronic board games by a plurality of users, at least one of which is physically located remotely from others of the plurality of users, (d) providing to users at least one recommendation of one or more electronic board games to play from at least one of the users' collection of electronic board games and a list of electronic board games in which none are part of the users' collection of electronic board games, based on at least one recommendation criterion, and (e) providing for limiting of access to at least one electronic board game in a user's collection of electronic board games by at least one of (i) providing for limiting of continuous play of the at least one electronic board game to a maximum time period, (ii) providing for limiting a total time of play of the at least one electronic board game within a predefined time period to a maximum time amount and (iii) providing for restricting of access to the at least one electronic board game by at least one user.

16. The one or more computer readable media of claim 15 wherein execution of the instructions further causes the one or more processors to provide for playing of the at least one of the one or more electronic board games by a plurality of users, at least one of which is physically located remotely from others of the plurality of users, by providing for remote playing of the at least one of the one or more electronic board games at least one of synchronously and asynchronously between the plurality of users.

17. A method for hosting an electronic board game service via a network, the method comprising:
providing one or more electronic board templates and a plurality of electronic board game piece templates for development of one or more electronic board games, wherein at least one of the one or more electronic board games includes a plurality of unique hardware game pieces and wherein each unique hardware game piece of the plurality of unique hardware game pieces comprises a communication device configured to produce a unique identification signal,
assigning a different one of the unique identification signals to each player of one or more corresponding players of the one or more electronic board games,
providing for acquisition of the one or more electronic board games by users of the electronic board game service,
providing to users of the electronic board game service at least one service relating to the one or more electronic board games, and
providing for selection in the development of the one or more electronic board games one or more rules for limiting modification of at least one electronic board game of the one or more electronic board games, wherein the at least one electronic board game comprises at least one of a plurality of different game features or at least one of a plurality of different types of game features,
wherein the one or more rules includes: (i) at least one rule to limit a total number of features of the at least one electronic board game that may be modified to a subset of the plurality of different game features, and/or (b) at least one rule to limit the types of features of the at least one of the one or more electronic board games which may be modified to a subset of the plurality of different types of game features, and/or (c) at least one rule to disable any modification of the at least one of the one or more electronic board games.

18. The method of claim 17, wherein the plurality of unique hardware game pieces each define a unique footprint,
and further comprising associating the plurality of unique hardware game pieces with the one or more corresponding plurality of players by assigning a different one of the unique footprints to each of the corresponding plurality of players.

19. The method of claim 17, further comprising:
providing for downloading by the users of the electronic board game service at least one of a full version, a limited version and a modifiable version of at least one of the one or more electronic board games, and
providing for uploading of the modifiable version of the at least one of the one or more electronic board games to a server of the electronic game service after the modifiable version is modified for one of free use by others and sale to others.

20. The method of claim 19, further comprising providing for uploading of the modified version for sale to others only upon acceptance by an uploader of the modified version of a revenue sharing amount between the uploader and a developer of the modified version which revenue sharing amount defines an amount of revenue resulting from sales of the modified version to others owed by the uploader to the developer.

21. The method of claim 17, further comprising providing to users of the electronic board game service the at least one service relating to the one or more electronic board games by (a) providing for downloading by the users one or more virtual game piece applications, (b) providing for downloading by the users one or more software applications associated with at least one of the one or more electronic board games for hiding certain information related to play by one player of the at least one of the one or more electronic board games from one or more other players of the at least one of the one or more electronic board games, (c) providing for playing of at least one of the one or more electronic board games by a plurality of users, at least one of which is physically located remotely from others of the plurality of users, (d) providing to users at least one recommendation of one or more electronic board games to play from at least one of the users' collection of electronic board games and a list of electronic board games in which none are part of the users' collection of electronic board games, based on at least one recommendation criterion, and (e) providing for limiting of access to at least one electronic board game in a user's collection of electronic board games by at least one of (i) providing for limiting of continuous play of the at least one electronic board game to a maximum time period, (ii) providing for limiting a total time of play of the at least one electronic board game within a predefined time period to a maximum time amount and (iii) providing for restricting of access to the at least one electronic board game by at least one user.

22. The method of claim 21, further comprising providing for playing of the at least one of the one or more electronic board games by a plurality of users, at least one of which is physically located remotely from others of the plurality of users, by providing for remote playing of the at least one of the one or more electronic board games at least one of synchronously and asynchronously between the plurality of users.

* * * * *